(12) United States Patent
Kaneki

(10) Patent No.: US 8,452,875 B2
(45) Date of Patent: May 28, 2013

(54) RESOURCE ALLOCATION APPARATUS, RESOURCE ALLOCATION PROGRAM AND RECORDING MEDIA, AND RESOURCE ALLOCATION METHOD

(75) Inventor: Yusuke Kaneki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 13/122,425

(22) PCT Filed: Oct. 13, 2008

(86) PCT No.: PCT/JP2008/068508
§ 371 (c)(1),
(2), (4) Date: Apr. 4, 2011

(87) PCT Pub. No.: WO2010/044131
PCT Pub. Date: Apr. 22, 2010

(65) Prior Publication Data
US 2011/0225300 A1 Sep. 15, 2011

(51) Int. Cl.
*G06F 15/173* (2006.01)
(52) U.S. Cl.
USPC ............................ 709/226; 707/616; 707/641
(58) Field of Classification Search
USPC .................................................. 707/641, 616
See application file for complete search history.

(56) References Cited

U.S. PATENT DOCUMENTS

| 7,346,627 B2 * | 3/2008 | Ramanathan et al. | 707/616 |
| 8,255,516 B1 * | 8/2012 | Zhang et al. | 709/224 |
| 2002/0087611 A1 * | 7/2002 | Tanaka et al. | 709/1 |
| 2002/0143945 A1 * | 10/2002 | Shahabuddin et al. | 709/226 |
| 2004/0111596 A1 | 6/2004 | Rawson, III | |
| 2004/0143945 A1 | 7/2004 | Christianson | |

(Continued)

FOREIGN PATENT DOCUMENTS

| JP | 2002 202959 | 7/2002 |
| JP | 2002 318791 | 10/2002 |

(Continued)

OTHER PUBLICATIONS

Ajiro, Y., et al., "A Combinatorial Optimitization Algorithm for Server Consolidation," The 21st Annual Conference of the Japanese Society for Artificial Intelligence, pp. 1-4, (2007) (with English Abstract and partial English translation).

(Continued)

*Primary Examiner* — Andrew Lai
*Assistant Examiner* — Mario Malcolm
(74) *Attorney, Agent, or Firm* — Oblon, Spivak, McClelland, Maier & Neustadt, L.L.P.

(57) ABSTRACT

A resource allocation apparatus 100 is an apparatus that allocates resource utilization amounts of m consolidation subject servers $S_i$ to be consolidated to n consolidation destination servers (n<m). An allocation subject list S contains the resource utilization amount of each consolidation subject server $S_i$. The resource allocation apparatus 100 calculates a deviation value of the resource utilization amount of each consolidation subject server $S_i$ in the allocation subject list S, and, based on the deviation value and a priority of each resource, calculates a total value with consideration given to the priority, and sorts the consolidation subject servers $S_i$ in descending order of the total value. An allocation unit 120 uses a calculated dispersion value to execute an allocation process on the consolidation subject servers $S_i$ sequentially starting with the one with the greatest total value.

6 Claims, 26 Drawing Sheets

U.S. PATENT DOCUMENTS

| | | |
|---|---|---|
| 2005/0172097 A1 | 8/2005 | Voigt et al. |
| 2005/0193227 A1 | 9/2005 | Nakahara et al. |
| 2008/0034366 A1 | 2/2008 | Tanaka et al. |

FOREIGN PATENT DOCUMENTS

| | | | |
|---|---|---|---|
| JP | 2004 192612 | | 7/2004 |
| JP | 2005 115653 | | 4/2005 |
| JP | 2005115653 A | * | 4/2005 |
| JP | 2005 208999 | | 8/2005 |
| JP | 2005 222539 | | 8/2005 |
| JP | 2005 234917 | | 9/2005 |
| JP | 2008 210001 | | 9/2008 |

OTHER PUBLICATIONS

International Search Report issued Dec. 22, 2008 in PCT/JP08/068508 filed Oct. 13, 2008.

* cited by examiner

Fig. 4

CONFIGURATION INFORMATION TABLE 121

| SYSTEM ID | HOST NAME | IPv4 ADDRESS | OS NAME | OS VERSION | CPU NAME | NUMBER OF CPUS |
|---|---|---|---|---|---|---|
| 0 | server0 | 192.168.10.10 | Linux | 2.6.18 | Xeon 3GHz | 1 |
| 1 | server1 | 192.168.10.11 | Linux | 2.6.18 | Xeon 3GHz | 2 |
| ... | ... | ... | ... | ... | ... | ... |

Fig. 5

CPU LOAD TABLE 131

| TIME | SYSTEM ID | CPU UTILIZATION RATE (USER) | CPU UTILIZATION RATE (SYSTEM) | CPU UTILIZATION RATE (IO WAIT) | CPU UTILIZATION RATE (IDLE) |
|---|---|---|---|---|---|
| 12:00:00 | 0 | 10 | 20 | 5 | 65 |
| 12:00:00 | 1 | 5 | 5 | 3 | 87 |
| 12:00:10 | 0 | 15 | 23 | 1 | 61 |
| 12:00:10 | 1 | 3 | 3 | 2 | 92 |
| 12:00:20 | 0 | 12 | 22 | 1 | 65 |
| 12:00:20 | 1 | 2 | 6 | 5 | 87 |
| ... | ... | ... | ... | ... | ... |

Fig. 6

MEMORY UTILIZATION AMOUNT TABLE

| TIME | SYSTEM ID | MEMORY UTILIZATION AMOUNT (KB) | MEMORY FREE AMOUNT (KB) |
|---|---|---|---|
| 12:00:00 | 0 | 200000 | 400000 |
| 12:00:00 | 1 | 400000 | 600000 |
| 12:00:10 | 0 | 210000 | 390000 |
| 12:00:10 | 1 | 380000 | 620000 |
| 12:00:20 | 0 | 200000 | 400000 |
| 12:00:20 | 1 | 420000 | 580000 |
| ... | ... | ... | ... |

DISK UTILIZATION AMOUNT TABLE — 133

| TIME | SYSTEM ID | DISK UTILIZATION AMOUNT (KB) | DISK FREE AMOUNT (KB) |
|---|---|---|---|
| 12:00:00 | 0 | 40000000 | 60000000 |
| 12:00:00 | 1 | 45000000 | 55000000 |
| 12:00:10 | 0 | 40000000 | 60000000 |
| 12:00:10 | 1 | 45000000 | 55000000 |
| 12:00:20 | 0 | 40000000 | 60000000 |
| 12:00:30 | 1 | 45000000 | 55000000 |
| ... | ... | ... | ... |

DISK ACCESS BAND TABLE

| TIME | SYSTEM ID | DISK READ SPEED (KB/s) | DISK READ IO COUNT (TIMES/s) | DISK WRITE SPEED (KB/s) | DISK WRITE IO COUNT (TIMES/s) |
|---|---|---|---|---|---|
| 12:00:00 | 0 | 1123.12 | 21 | 516.11 | 13 |
| 12:00:10 | 1 | 1211.20 | 34 | 1112.04 | 56 |
| 12:00:10 | 0 | 2232.21 | 32 | 938.42 | 12 |
| 12:00:10 | 1 | 413.22 | 44 | 3360.22 | 65 |
| 12:00:20 | 0 | 525.98 | 51 | 373.80 | 32 |
| 12:00:30 | 1 | 2971.50 | 31 | 2370.34 | 23 |
| ... | ... | ... | ... | ... | ... |

Fig. 9

NETWORK LOAD TABLE 135

| TIME | SYSTEM ID | NETWORK TRANSMISSION SPEED (KB/s) | NETWORK TRANSMISSION IO COUNT (TIMES/s) | NETWORK RECEPTION SPEED (KB/s) | NETWORK RECEPTION IO COUNT (TIMES/s) |
|---|---|---|---|---|---|
| 12:00:00 | 0 | 243.22 | 17 | 213.21 | 53 |
| 12:00:00 | 1 | 1121.71 | 37 | 157.23 | 56 |
| 12:00:10 | 0 | 212.43 | 17 | 432.42 | 42 |
| 12:00:10 | 1 | 412.24 | 41 | 222.22 | 32 |
| 12:00:20 | 0 | 512.92 | 253 | 331.80 | 82 |
| 12:00:30 | 1 | 212.30 | 34 | 672.34 | 89 |
| ... | ... | ... | ... | ... | ... |

Fig.11

ALLOCATION SUBJECT LIST S

| $S_i$ i = 1-7 | CPU UTILIZATION AMOUNT $P_{cpu,i}$ | MEMORY UTILIZATION AMOUNT $P_{mem,i}$ | DISK UTILIZATION AMOUNT $P_{disk,i}$ | DISK ACCESS BAND $P_{DA,i}$ | NETWORK ACCESS BAND $P_{NA,i}$ | TOTAL VALUE $P_{SS,i}$ |
|---|---|---|---|---|---|---|
| $S_1$ | | | | | | 60 |
| $S_2$ | | | | | | 40 |
| $S_3$ | | | | | | 70 |
| $S_4$ | | | | | | 20 |
| $S_5$ | | | | | | 50 |
| $S_6$ | | | | | | 10 |
| $S_7$ | | | | | | 30 |
| $\Sigma P_i$ | | | | | | |

Fig. 13

| PRIORITY $\alpha$ | | | | |
|---|---|---|---|---|
| PRIORITY OF CPU UTILIZATION RATE $\alpha_{cpu}$ | PRIORITY OF MEMORY UTILIZATION AMOUNT $\alpha_{mem}$ | PRIORITY OF DISK UTILIZATION AMOUNT $\alpha_{disk}$ | PRIORITY OF DISK ACCESS BAND $\alpha_{DA}$ | PRIORITY OF NETWORK ACCESS BAND $\alpha_{NA}$ |
| 50 | 20 | 10 | 10 | 10 |

Fig. 14

| S'<br>ALLOCATION DESTINATION LIST | | | | | |
|---|---|---|---|---|---|
| $S'_j$<br>j = 1-3 | CPU CAPACITY | MEMORY CAPACITY | DISK CAPACITY | DISK ACCESS BAND | NETWORK ACCESS BAND |
| $S'_1$ | $P'_{cpu, limit}$ | $P'_{mem, limit}$ | $P'_{disk, limit}$ | $P'_{DA, limit}$ | $P'_{NA, limit}$ |
| $S'_2$ | ← | ← | ← | ← | ← |
| $S'_3$ | ← | ← | ← | ← | ← |

Fig. 15

| ALLOCATION SUBJECT LIST (SORTED) | | | | | | |
|---|---|---|---|---|---|---|
| $S_i$ i = 1-7 | CPU UTILIZATION AMOUNT $P_{cpu, i}$ | MEMORY UTILIZATION AMOUNT $P_{mem, i}$ | DISK UTILIZATION AMOUNT $P_{disk, i}$ | DISK ACCESS BAND $P_{DA, i}$ | NETWORK ACCESS BAND $P_{NA, i}$ | TOTAL VALUE $P_{SS, i}$ |
| $S_3$ | | | | | | 322 |
| $S_1$ | | | | | | 189 |
| $S_5$ | | | | | | 184 |
| $S_2$ | | | | | | -50 |
| $S_7$ | | | | | | -200 |
| $S_4$ | | | | | | -210 |
| $S_6$ | | | | | | -301 |
| $\Sigma P_i$ | | | | | | |

Fig. 16

| ALLOCATABLE LIST A | | |
|---|---|---|
| $S_i$ (i = 3) | $S'_j$ (j = 1-3) | DISPERSION $P'_{sd}$ |
| $S_3$ | $S'_1$ | 20 |
| ↑ | $S'_2$ | 10 |
| ↑ | $S'_3$ | 30 |

Fig. 17

$[i=3]$ $(j=1)$ $$P'_{cpu, avg} = \frac{1}{3}\underbrace{\{P'_{cpu,1} + P'_{cpu,2} + P'_{cpu,3}\}}_{<P3>}$$

$$P'_{cpu, sd} = \sqrt{\frac{1}{3}[(P'_{cpu,avg} - P'_{cpu,1})^2 + (P'_{cpu,avg} - P'_{cpu,2})^2 + \underbrace{(P'_{cpu,avg} - P'_{cpu,3})^2]}_{<P3>}}$$

$$P'_{sd} = \alpha_{cpu}\frac{P'_{cpu,sd}}{P'_{cpu,avg}} + \alpha_{mem}\frac{P'_{mem,sd}}{P'_{mem,avg}} + \alpha_{disk}\frac{P'_{disk,sd}}{P'_{disk,avg}}$$

$(j=2)$ $$P'_{cpu, avg} = \frac{1}{3}\underbrace{\{P'_{cpu,1} + P'_{cpu,2} + P'_{cpu,3}\}}_{<P3>}$$

$$P'_{cpu, sd} = \sqrt{\frac{1}{3}[(P'_{cpu,avg} - P'_{cpu,1})^2 + (P'_{cpu,avg} - P'_{cpu,2})^2 + \underbrace{(P'_{cpu,avg} - P'_{cpu,3})^2]}_{<P3>}}$$

$$P'_{sd} = \alpha_{cpu}\frac{P'_{cpu,sd}}{P'_{cpu,avg}} + \alpha_{mem}\frac{P'_{mem,sd}}{P'_{mem,avg}} + \alpha_{disk}\frac{P'_{disk,sd}}{P'_{disk,avg}}$$

$(j=3)$ $$P'_{cpu, avg} = \frac{1}{3}\underbrace{\{P'_{cpu,1} + P'_{cpu,2} + P'_{cpu,3}\}}_{<P3>}$$

$$P'_{cpu, sd} = \sqrt{\frac{1}{3}[(P'_{cpu,avg} - P'_{cpu,1})^2 + (P'_{cpu,avg} - P'_{cpu,2})^2 + \underbrace{(P'_{cpu,avg} - P'_{cpu,3})^2]}_{<P3>}}$$

$$P'_{sd} = \alpha_{cpu}\frac{P'_{cpu,sd}}{P'_{cpu,avg}} + \alpha_{mem}\frac{P'_{mem,sd}}{P'_{mem,avg}} + \alpha_{disk}\frac{P'_{disk,sd}}{P'_{disk,avg}}$$

Fig. 18

$[i=1]$ $(j=1)$ $$P'_{cpu,avg} = \frac{1}{3} \{P'_{cpu,1} + P'_{cpu,2} + P'_{cpu,3}\} \quad \boxed{P3} \langle P1 \rangle$$

$$P'_{cpu,sd} = \sqrt{\frac{1}{3}[(P'_{cpu,avg} - P'_{cpu,1})^2 + (P'_{cpu,avg} - P'_{cpu,2})^2 + (P'_{cpu,avg} - P'_{cpu,3})^2]}$$

$$P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$$

$(j=2)$ $$P'_{cpu,avg} = \frac{1}{3} \{P'_{cpu,1} + P'_{cpu,2} + P'_{cpu,3}\} \quad \boxed{P3} \langle P1 \rangle$$

$$P'_{cpu,sd} = \sqrt{\frac{1}{3}[(P'_{cpu,avg} - P'_{cpu,1})^2 + (P'_{cpu,avg} - P'_{cpu,2})^2 + (P'_{cpu,avg} - P'_{cpu,3})^2]} \langle P1 \rangle$$

$$P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$$

$(j=3)$ $$P'_{cpu,avg} = \frac{1}{3} \{P'_{cpu,1} + P'_{cpu,2} + P'_{cpu,3}\} \quad \boxed{P3} \langle P1 \rangle$$

$$P'_{cpu,sd} = \sqrt{\frac{1}{3}[(P'_{cpu,avg} - P'_{cpu,1})^2 + (P'_{cpu,avg} - P'_{cpu,2})^2 + (P'_{cpu,avg} - P'_{cpu,3})^2]} \langle P1 \rangle$$

$$P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$$

$$P'_{cpu, avg} = \frac{1}{3} \{P'_{cpu, 1} + P'_{cpu, 2} + P'_{cpu, 3}\} \quad \langle P5 \rangle \; \boxed{P3} \; \boxed{P1}$$

$$P'_{cpu, sd} = \sqrt{\frac{1}{3}[(P'_{cpu, avg} - P'_{cpu, 1})^2 + (P'_{cpu, avg} - P'_{cpu, 2})^2 + (P'_{cpu, avg} - P'_{cpu, 3})^2]} \quad \boxed{P1}$$

$$P'_{sd} = \alpha_{cpu} \frac{P'_{cpu, sd}}{P'_{cpu, avg}} + \alpha_{mem} \frac{P'_{mem, sd}}{P'_{mem, avg}} + \alpha_{disk} \frac{P'_{disk, sd}}{P'_{disk, avg}} \quad \langle P5 \rangle$$

(j = 2)

$$P'_{cpu, avg} = \frac{1}{3} \{P'_{cpu, 1} + P'_{cpu, 2} + P'_{cpu, 3}\} \quad \langle P5 \rangle \; \boxed{P3} \; \boxed{P1}$$

$$P'_{cpu, sd} = \sqrt{\frac{1}{3}[(P'_{cpu, avg} - P'_{cpu, 1})^2 + (P'_{cpu, avg} - P'_{cpu, 2})^2 + (P'_{cpu, avg} - P'_{cpu, 3})^2]} \quad \boxed{P1}$$

$$P'_{sd} = \alpha_{cpu} \frac{P'_{cpu, sd}}{P'_{cpu, avg}} + \alpha_{mem} \frac{P'_{mem, sd}}{P'_{mem, avg}} + \alpha_{disk} \frac{P'_{disk, sd}}{P'_{disk, avg}} \quad \langle P5 \rangle$$

(j = 3)

$$P'_{cpu, avg} = \frac{1}{3} \{P'_{cpu, 1} + P'_{cpu, 2} + P'_{cpu, 3}\} \quad \boxed{P3} \; \boxed{P1}$$

$$P'_{cpu, sd} = \sqrt{\frac{1}{3}[(P'_{cpu, avg} - P'_{cpu, 1})^2 + (P'_{cpu, avg} - P'_{cpu, 2})^2 + (P'_{cpu, avg} - P'_{cpu, 3})^2]} \quad \boxed{P1} \; \langle P5 \rangle$$

$$P'_{sd} = \alpha_{cpu} \frac{P'_{cpu, sd}}{P'_{cpu, avg}} + \alpha_{mem} \frac{P'_{mem, sd}}{P'_{mem, avg}} + \alpha_{disk} \frac{P'_{disk, sd}}{P'_{disk, avg}}$$

$P'_{cpu, avg} = \frac{1}{3} \{P'_{cpu,1} + P'_{cpu,2} + P'_{cpu,3}\}$ ⟨P3⟨P2⟩, P1, P5⟨P2⟩⟩

$P'_{cpu, sd} = \sqrt{\frac{1}{3}[(P'_{cpu, avg} - P'_{cpu,1})^2 + (P'_{cpu, avg} - P'_{cpu,2})^2 + (P'_{cpu, avg} - P'_{cpu,3})^2]}$ ⟨P3, P1⟨P2⟩, P5⟩

$P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$ (j = 2)

$P'_{cpu, avg} = \frac{1}{3} \{P'_{cpu,1} + P'_{cpu,2} + P'_{cpu,3}\}$ ⟨P3, P1⟨P2⟩, P5⟩

$P'_{cpu, sd} = \sqrt{\frac{1}{3}[(P'_{cpu, avg} - P'_{cpu,1})^2 + (P'_{cpu, avg} - P'_{cpu,2})^2 + (P'_{cpu, avg} - P'_{cpu,3})^2]}$ ⟨P3, P1, P5⟨P2⟩⟩

$P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$ (j = 3)

$P'_{cpu, avg} = \frac{1}{3} \{P'_{cpu,1} + P'_{cpu,2} + P'_{cpu,3}\}$ ⟨P3, P1, P5⟨P2⟩⟩

$P'_{cpu, sd} = \sqrt{\frac{1}{3}[(P'_{cpu, avg} - P'_{cpu,1})^2 + (P'_{cpu, avg} - P'_{cpu,2})^2 + (P'_{cpu, avg} - P'_{cpu,3})^2]}$ $P'_{sd} = \alpha_{cpu} \frac{P'_{cpu,sd}}{P'_{cpu,avg}} + \alpha_{mem} \frac{P'_{mem,sd}}{P'_{mem,avg}} + \alpha_{disk} \frac{P'_{disk,sd}}{P'_{disk,avg}}$

Fig. 21

CPU LOAD TABLE 131-1

| TIME | SYSTEM ID | CPU NUMBER | CPU UTILIZATION RATE (USER) | CPU UTILIZATION RATE (SYSTEM) | CPU UTILIZATION RATE (IO WAIT) | CPU UTILIZATION RATE (IDLE) |
|---|---|---|---|---|---|---|
| 12:00:00 | 0 | 0 | 10 | 20 | 5 | 65 |
| 12:00:00 | 0 | 1 | 5 | 5 | 3 | 87 |
| 12:00:00 | 1 | 0 | 15 | 23 | 1 | 61 |
| 12:00:00 | 1 | 1 | 3 | 3 | 2 | 92 |
| 12:00:10 | 0 | 0 | 12 | 22 | 1 | 65 |
| 12:00:10 | 0 | 1 | 2 | 6 | 5 | 87 |
| 12:00:10 | 1 | 0 | 10 | 20 | 5 | 65 |
| 12:00:10 | 1 | 1 | 5 | 5 | 3 | 87 |
| 12:00:20 | 0 | 0 | 15 | 23 | 1 | 61 |
| 12:00:20 | 0 | 1 | 3 | 3 | 2 | 92 |
| 12:00:20 | 1 | 0 | 12 | 22 | 1 | 65 |
| 12:00:20 | 1 | 1 | 2 | 6 | 5 | 87 |
| ... | ... | ... | ... | ... | ... | ... |

RESOURCE ALLOCATION APPARATUS, RESOURCE ALLOCATION PROGRAM AND RECORDING MEDIA, AND RESOURCE ALLOCATION METHOD

TECHNICAL FIELD

This invention relates to a resource allocation apparatus 100 that allocates the resource utilization amounts of m consolidation subject servers $S_i$ to be consolidated to n consolidation destination servers (n<m).

BACKGROUND ART

Server consolidation using virtualization technology virtualizes several hundred to several thousand servers (consolidation subject servers) in an enterprise to consolidate them into a smaller number of high-performance servers (consolidation destination servers). To have a plurality of servers operate on a single physical server, it is necessary to estimate the resource capacity of each consolidation destination server, the number of consolidation destination servers, and a combination of a consolidation subject server and a consolidation destination server so that the resources (a CPU, a disk, a network, etc.) required by the server to be consolidated can be accommodated into the resource capacity of the consolidation destination server.

It is therefore necessary to collect the operational resource utilization amounts (a CPU utilization rate, a disk utilization amount, etc.) of consolidation subject servers, and, based on the collected information and the resource capacity of consolidation destination servers, to calculate a combination of a consolidation subject server and a consolidation destination server that distributes the resource utilization amounts equally without exceeding the resource capacity of the consolidation destination server.

In Non-Patent Literature 1, the problem of calculating a combination of a consolidation subject server and a consolidation destination server in server consolidation using virtualization technology is discussed as the bin packing problem (a problem of packing items of different volumes into a finite number of bins in a way that minimizes the number of bins used). This problem is solved by using an improved First-Fit Decreasing (FFD) algorithm, which is one of heuristic solutions. In the improved FFD, if the capacity of bins is exceeded, instead of immediately adding a new bin, the item that failed to be packed is treated as a large item of an unnoticed dimension and the order of items is altered so that this item is packed first. A threshold is set to the number of times the order of items is altered. If the threshold is exceeded, a new bin is added. By altering the order of items in this way, an excessive increase of the number of bins is prevented to achieve optimization.

According to this literature, by considering an unnoticed dimension by reordering, an optimum solution is obtained with low computational cost. However, only one dimension is considered, and it is not possible to consider a plurality of dimensions such as CPUs and disks, or to consider priorities. A method has been devised for measuring the system load from a plurality of virtual machines in operation and computing a combination of virtual machines that maximizes the performance in a virtualized environment.

On the other hand, Patent Literature 1 teaches a method of optimally allocating hosting service resources. This invention teaches a method of modeling the utilization patterns of clients and allocating a combination of clients to a server in a way that disperses the peaks of individual utilization patterns. For allocation, the use of FFD is also discussed.

Patent Literature 1: JP 2002-318791 A

Non-Patent Literature 1: Yasuhiro Ajiro, Atsuhiro Tanaka, "A Combinatorial Optimization Algorithm for Server Consolidation", The 21st Annual Conference of the Japanese Society for Artificial Intelligence, 2007

DISCLOSURE OF INVENTION

Technical Problem

In conventional allocation methods, attention is focused on minimizing the number of allocation destination servers by using FFD, etc., devising an allocation combination that disperses the peaks of utilization patterns of clients, and so on, and no method discusses the balance of resources after being allocated. Especially when using the FFD, resources are allocated to servers sequentially starting with the largest one and a new server is added when there are not enough servers. This causes resources of large sizes to be allocated to the same server. Since resources of large sizes also have a large fluctuation range, allocating resources of large sizes to the same server increases the probability of a resource shortage. Preferably, therefore, resources should be allocated as equally as possible among servers.

The present invention aims to provide a resource allocation apparatus that determines a combination of a consolidation subject server apparatus and a consolidation destination server apparatus that distributes resource utilization amounts equally after the consolidation subject server apparatus to be consolidated is consolidated into the consolidation destination server apparatus used as a consolidation destination.

Solution to Problem

A resource allocation apparatus according to this invention includes a list storage unit configured to store a consolidation subject list S containing a resource utilization amount of each resource type of each of an m number of consolidation subject server apparatuses (m: an integer satisfying m≧3) to be consolidated and a consolidation destination list S' containing an n number of consolidation destination server apparatuses (n: an integer satisfying n<m and n≧2) to be used as consolidation destinations of the m number of consolidation subject server apparatuses contained in the consolidation subject list S;

a priority storage unit configured to store a priority specified for the each resource type; and an allocation unit configured to select one of the consolidation subject server apparatuses from the consolidation subject list S and also select one of the consolidation destination server apparatuses from the consolidation destination list S', and, based on a current resource utilization amount of the selected one of the consolidation destination server apparatuses when the resource utilization amount of the selected one of the consolidation subject server apparatuses is tentatively allocated to the selected one of the consolidation destination server apparatuses and each current resource utilization amount of all other of the consolidation destination server apparatuses contained in the consolidation destination list S', calculate a coefficient of variation defined as a ratio of an average to a standard deviation for the each resource type, multiply each of the coefficient of variation calculated for the each resource type by the priority specified for a same resource type as the each resource type corresponding to the each of the coefficient of variation so as to calculate a sum of respective multiplied results as a dispersion value, by selecting another one of the consolidation destination server apparatuses from the consolidation destination list S' so as to select the consolidation destination server apparatuses one after another, calculate the dispersion value when the resource utilization amount of the selected one of the consolidation subject server apparatuses is tentatively allocated to the selected another one of the consolidation destination server apparatuses, as described above, identify one of the consolidation destination server apparatuses corresponding to a minimum of the dispersion value among each of the dispersion value calculated for when the resource utilization amount of the selected one of the consolidation subject server apparatuses is tentatively allocated to each of the n number of consolidation destination server apparatuses, determine that the resource utilization amount of the selected one of the consolidation subject server apparatuses should be allocated to the identified one of the consolidation destination server apparatuses, by selecting another one of the consolidation subject server apparatuses from the consolidation subject list S so as to select the consolidation subject server apparatuses one after another, identify one of the consolidation destination server apparatuses corresponding to a minimum of the dispersion value among each of the dispersion value calculated for when the resource utilization amount of the selected another one of the consolidation subject server apparatuses is allocated to each of the n number of consolidation destination server apparatuses, and determine that the resource utilization amount of the selected another one of the consolidation subject server apparatuses should be allocated to the identified one of the consolidation destination server apparatuses, as described above.

The allocation unit is configured to calculate a deviation value of the resource utilization amount of each of the consolidation subject server apparatuses for the each resource type contained in the consolidation subject list S, multiply the deviation value calculated for the each resource type by the priority specified for a same resource type as the each resource type of the deviation value to calculate a sum of respective multiplied results as a total value, and when selecting one of the consolidation subject server apparatuses from the consolidation subject list S, select one of the consolidation subject server apparatuses from the consolidation subject list S according to the calculated total value.

The resource allocation apparatus further includes a resource capacity storage unit configured to store a resource capacity of the each resource type of the consolidation destination server apparatuses, and the allocation unit is configured to calculate a tentative number of the consolidation destination server apparatuses for the each resource type based on the resource capacity stored in the resource storage unit and the resource utilization amount contained in the consolidation subject list S, and, from each of the calculated tentative number, determine a number calculated for a same resource type as a resource type for which a maximum of the priority is specified, as a number n of the consolidation destination server apparatuses.

The consolidation subject server apparatuses and the consolidation destination server apparatuses mutually have a plurality of devices of at least one same resource type of mutually shared same resource types, and when the allocation unit tentatively allocates the resource utilization amount of the same resource type of the selected one of the consolidation subject server apparatuses to the selected one of the consolidation destination server apparatuses, each time the allocation unit sequentially allocates each resource utilization amount of the plurality of devices of the selected one of the consolidation subject server apparatuses to any device of the plurality of devices of the selected one of the consolidation destination server apparatuses, the allocation unit is configured to evaluate whether a post-allocation resource utilization amount of the any device to which the resource utilization amount is allocated is within an allowable amount.

A resource allocation program according to this invention causes a computer to function as a list storage unit configured to store a consolidation subject list S containing a resource utilization amount of each resource type of each of an m number of consolidation subject server apparatuses (m: an integer satisfying m≧3) to be consolidated and a consolidation destination list S' containing an n number of consolidation destination server apparatuses (n: an integer satisfying n<m and n≧2) to be used as consolidation destinations of the m number of consolidation subject server apparatuses contained in the consolidation subject list S;

a priority storage unit configured to store a priority specified for the each resource type; and an allocation unit configured to select one of the consolidation subject server apparatuses from the consolidation subject list S and also select one of the consolidation destination server apparatuses from the consolidation destination list S', and, based on a current resource utilization amount of the selected one of the consolidation destination server apparatuses when the resource utilization amount of the selected one of the consolidation subject server apparatuses is tentatively allocated to the selected one of the consolidation destination server apparatuses and each current resource utilization amount of all other of the consolidation destination server apparatuses contained in the consolidation destination list S', calculate a coefficient of variation defined as a ratio of an average to a standard deviation for the each resource type, multiply each of the coefficient of variation calculated for the each resource type by the priority specified for a same resource type as the each resource type corresponding to the each of the coefficient of variation so as to calculate a sum of respective multiplied results as a dispersion value, by selecting another one of the consolidation destination server apparatuses from the consolidation destination list S' so as to select the consolidation destination server apparatuses one after another, calculate the dispersion value when the resource utilization amount of the selected one of the consolidation subject server apparatuses is tentatively allocated to the selected another one of the consolidation destination server apparatuses, as described above, identify one of the consolidation destination server apparatuses corresponding to a minimum of the dispersion value among each of the dispersion value calculated for when the resource utilization amount of the selected one of the consolidation subject server apparatuses is tentatively allocated to each of the n number of consolidation destination server apparatuses, determine that the resource utilization amount of the selected one of the consolidation subject server apparatuses should be allocated to the identified one of the consolidation destination server apparatuses, by selecting another one of the consolidation subject server apparatuses from the consolidation subject list S so as to select the consolidation subject server apparatuses one after another, identify one of the consolidation destination server apparatuses corresponding to a minimum of the dispersion value among each of the dispersion value calculated for when the resource utilization amount of the selected another one of the consolidation subject server apparatuses is allocated to each of the n number of consolidation destination server apparatuses, and determine that the resource utilization amount of the selected another one of the consolidation subject server apparatuses should be allocated to the identified one of the consolidation destination server apparatuses, as described above.

A resource allocation method according to this invention is performed by a computer including a list storage unit, a priority storage unit, and an allocation unit, and the resource allocation method includes (1) by the list storage unit, storing a consolidation subject list S containing a resource utilization amount of each resource type of each of an m number of consolidation subject server apparatuses (m: an integer satisfying $m \geq 3$) to be consolidated and a consolidation destination list S' containing an n number of consolidation destination server apparatuses (n: an integer satisfying $n < m$ and $n \geq 2$) to be used as consolidation destinations of the m number of consolidation subject server apparatuses contained in the consolidation subject list S;

(2) by the priority storage unit, storing a priority specified for the each resource type; and (3) by the allocation unit, selecting one of the consolidation subject server apparatuses from the consolidation subject list S and also selecting one of the consolidation destination server apparatuses from the consolidation destination list S', and, based on a current resource utilization amount of the selected one of the consolidation destination server apparatuses when the resource utilization amount of the selected one of the consolidation subject server apparatuses is tentatively allocated to the selected one of the consolidation destination server apparatuses and each current resource utilization amount of all other of the consolidation destination server apparatuses contained in the consolidation destination list S', calculating a coefficient of variation defined as a ratio of an average to a standard deviation for the each resource type, multiplying each of the coefficient of variation calculated for the each resource type by the priority specified for a same resource type as the each resource type corresponding to the each of the coefficient of variation so as to calculate a sum of respective multiplied results as a dispersion value, by selecting another one of the consolidation destination server apparatuses from the consolidation destination list S' so as to select the consolidation destination server apparatuses one after another, calculating the dispersion value when the resource utilization amount of the selected one of the consolidation subject server apparatuses is tentatively allocated to the selected another one of the consolidation destination server apparatuses, as described above, identifying one of the consolidation destination server apparatuses corresponding to a minimum of the dispersion value among each of the dispersion value calculated for when the resource utilization amount of the selected one of the consolidation subject server apparatuses is tentatively allocated to each of the n number of consolidation destination server apparatuses, determining that the resource utilization amount of the selected one of the consolidation subject server apparatuses should be allocated to the identified one of the consolidation destination server apparatuses, by selecting another one of the consolidation subject server apparatuses from the consolidation subject list S so as to select the consolidation subject server apparatuses one after another, identifying one of the consolidation destination server apparatuses corresponding to a minimum of the dispersion value among each of the dispersion value calculated for when the resource utilization amount of the selected another one of the consolidation subject server apparatuses is allocated to each of the n number of consolidation destination server apparatuses, and determining that the resource utilization amount of the selected another one of the consolidation subject server apparatuses should be allocated to the identified one of the consolidation destination server apparatuses, as described above.

Advantageous Effects of Invention

The present invention can provide a resource allocation apparatus that determines a combination of a consolidation subject server apparatus and a consolidation destination server apparatus that distributes resource utilization amounts equally after the consolidation subject server apparatus is consolidated into the consolidation destination server apparatus.

DESCRIPTION OF PREFERRED EMBODIMENTS

Embodiment 1

FIG. 1 is a diagram showing an example of an external view of the resource allocation apparatus 100 implemented with a computer. In FIG. 1, the resource allocation apparatus 100 includes hardware resources, such as a system unit 830, a display device 813 having a display screen such as a CRT (Cathode Ray Tube) or an LCD (Liquid Crystal Display), a keyboard 814 (K/B), a mouse 815, an FDD 817 (Flexible Disk Drive), a compact disk drive 818 (CDD), and a printer device 819. These are connected through a cable or a signal line. The system unit 830 is connected to a network 801.

FIG. 2 is a diagram showing an example of hardware resources of the resource allocation apparatus 100 implemented with a computer. In FIG. 2, the resource allocation apparatus 100 includes a CPU 810 (Central Processing Unit) that executes a program. The CPU 810 is connected through a bus 825 with a ROM (Read Only Memory) 811, a RAM (Random Access Memory) 812, the display device 813, the keyboard 814, the mouse 815, a communication board 816, the FDD 817, the CDD 818, the printer device 819, and a magnetic disk device 820, and controls these hardware devices. In place of the magnetic disk device 820, a memory device such as an optical disk device or a flash memory can be used.

The RAM 812 is an example of a volatile memory. The memory media such as the ROM 811, the FDD 817, the CDD 818, and the magnetic disk device 820 are examples of a nonvolatile memory. These are examples of a memory device, a memory unit, a storage unit or a buffer. The communication board 816, the keyboard 814, the FDD 817, etc. are examples of an input unit or an input device. The communication board 816, the display device 813, the printer device 819, etc. are examples of an output unit or an output device.

The communication board 816 is connected to the network 801 (LAN, etc.). The communication board 816 may be connected to the Internet, a WAN (Wide Area Network) such as ISDN, and so on, not being limited to the LAN.

The magnetic disk device 820 stores an operating system 821 (OS), a window system 822, a program group 823, and a file group 824. Programs of the program group 823 are executed by the CPU 810, the operating system 821, or the window system 822.

The program group 823 stores programs for executing each function described as a " . . . unit" in the description of embodiments herein. The programs are read and executed by the CPU 810.

The file group 824 stores, as each item of a "... file" or a "... database", information described as an "allocation subject list S", an "allocation destination resource capacity P'", a "priority α", an "allocation destination list S'", an "allocatable list A", or a "... table", or information, data, a signal value, a variable value, or a parameter described as a "result of evaluation of ...", a "result of calculation of ...", a "result of extraction of ...", a "result of generation of ...", or a "result of processing of ..." in the description of embodiments herein. A "... file" or a "... database" is stored in a storage medium such as a disk or a memory. Information, data, signal values, variable values, and parameters stored in storage media such as a disk or a memory are read by the CPU 810 via a read/write circuit to a main memory or a cache memory, and are used for CPU operations such as extraction, search, reference, comparison, computation, calculation, processing, output, printing, and display. During CPU operations such as extraction, search, reference, comparison, computation, calculation, processing, output, printing, and display, information, data, signal values, variable values, and parameters are temporarily stored in the main memory, the cache memory or a buffer memory In the description of embodiments herein, data and signal values are recorded in recording media such a memory of the RAM 812, a flexible disk of the FDD 817, a compact disk of the CDD 818, a magnetic disk of the magnetic disk device 820, and also an optical disk, a minidisk, a DVD (Digital Versatile Disk), and so on. Data and signal values are transmitted online through the bus 825, a signal line, a cable, and other transmission media.

In the description of embodiments herein, that which is described as a "... unit" may be a "... means", a "... circuit" or a "... device" and may also be a "... step", a "... procedure" or a "... process". In other words, that which is described as a "... unit" may be implemented by firmware stored in the ROM 811. Alternatively, it may be implemented entirely by software, or entirely by hardware such as elements, devices, boards, and wirings, or by a combination of software and hardware, or a combination further including firmware. Firmware and software are stored as programs in recording media such as a magnetic disk, a flexible disk, an optical disk, a compact disk, a minidisk, and a DVD. The programs are read by the CPU 810 and executed by the CPU 810. That is, the programs cause a computer to function as each "... unit" described herein. Alternatively, the programs cause a computer to execute a procedure or a method of each "... unit" described herein.

FIG. 3 is a block diagram showing a configuration of the resource allocation apparatus 100 of the first embodiment. Before describing the configuration of FIG. 3, the terms used will be defined below.

DEFINITION OF TERMS (1) "Consolidation Subject Server Apparatus"

The resource allocation apparatus 100 of the first embodiment is a resource allocation apparatus that allocates (consolidates) the functions of a plurality of server apparatuses (m servers) to n server apparatuses (n<m). In this case, a server apparatus (called hereinafter a server) to be consolidated is called a consolidation subject server, an allocation subject server, an allocation subject, or a source server. An individual source server is represented by the symbol "$S_i$".

(2) "Consolidation Destination Server"

A server used as a consolidation destination (a server where the functions of a plurality of source servers are implemented) is called a consolidation destination server, an allocation destination server, an allocation destination, or a destination server. A destination server is represented by the symbol "$S'_j$" (a "'" (prime) is appended to a symbol related to a destination server).

(3) "Resource Utilization Amount of a Source Server"

The CPU utilization amount (CPU load), memory utilization amount (memory load), etc. of the source server $S_i$ are represented by the symbol "P", such as a CPU utilization amount $P_{cpu,i}$ and a memory utilization amount $P_{mem,i}$.

(4) "Resource Capacity of a Destination Server"

The CPU capacity, memory capacity, etc. of the destination server $S'_j$ are represented by the symbol "P'", such as a CPU capacity $P'_{cpu,j}$, a memory capacity $P'_{mem,j}$.

The resource allocation apparatus 100 is an apparatus in which an allocation program operates. As shown in FIG. 3, the resource allocation apparatus 100 includes an input unit 110, an allocation unit 120, a table storage unit 130, and a list storage unit 140 (an example of a priority storage unit, an example of a resource capacity storage unit).

(Input Unit 110)

The input unit 110 inputs the "allocation subject list S" (which may also be called first input information), the "allocation destination resource capacity P'" (which may also be called second input information), and the "priority α" (which may also be called third input information), as will be described later.

(List Storage Unit 140)

The list storage unit 140 stores the "allocation subject list S" input by the input unit 110, the "allocation destination list S'" generated by the allocation unit 120, and so on.

(Table Storage Unit 130)

The table storage unit 130 stores a configuration information table 121, a CPU load table 131, and so on. Predetermined data is pre-set in the configuration information table 121 and each table of the CPU load table 131 to a network load table 135.

(Tables)

FIG. 4 shows the configuration information table 121.

FIG. 5 shows the CPU load table 131 in which the load of each allocation subject (source server) is stored.

FIG. 6 shows a memory utilization amount table 132.

FIG. 7 shows a disk utilization amount table 133.

FIG. 8 shows a disk access band table 134.

FIG. 9 shows the network load table 135.

(Allocation Unit 120)

The allocation unit 120 allocates resources. The functions of the allocation unit 120 will be described in detail in the description of operations later.

(Operations)

Next, operations will be described. FIG. 10 is a flowchart showing a resource "allocation operation". Referring to FIG. 10, operations of the resource allocation apparatus 100 will be described.

(S500a: Input by the Input Unit 110)

In Step S500a (hereinafter simply described as S500a, etc.), the input unit 110 first inputs three types of input information, such as the "allocation subject list S", the "allocation destination resource capacity P'", and the "priority α" in allocation. These types of input information will be described first.

(First Input Information: Allocation Subject List S)

FIG. 11 is a diagram showing an example of the "allocation subject list S", i.e., the first input information. Although, in FIG. 11, values are shown in the "total value $P_{ss,i}$" column, this is to be used later for explanation purposes and only source servers $S_i$ (i=1 to 7 in FIG. 11) are entered at input time. In this way, at input time, allocation subjects $S_i$ (i=1 to m) are entered in the "allocation subject list S", where m denotes the number of allocation subjects $S_i$. In FIG. 11, "i=1 to 7" is an example.

(Second Input Information: Allocation Destination Resource Capacity P')

FIG. 12 is a diagram showing an example of the "allocation destination resource capacity P'", i.e., the second input information. The allocation destination resource capacity P' of a destination server is expressed as shown below. This second input information P' indicates the upper limit P' of the capacity of one destination server $S'_j$.

For example, the "allocation destination resource capacity P'" includes the following:
(1) the upper limit of CPU utilization rate (utilization amount) (%),
(2) the upper limit of memory utilization amount (KB),
(3) the upper limit of disk utilization amount (KB),
(4) the upper limit of disk access band (KB/s), and
(5) the upper limit of network access band (KB/s).

For one allocation destination server $S'_j$, each resource capacity is defined as:
(1) the upper limit of CPU utilization rate: $P'_{cpu, limit}$,
(2) the upper limit of memory utilization amount: $P'_{mem, limit}$,
(3) the upper limit of disk utilization amount: $P'_{disk, limit}$,
(4) the upper limit of disk access band: $P'_{DA, limit}$, and
(5) the upper limit of network access band: $P'_{NA, limit}$.
These capacities of the "allocation destination resource capacity P'" correspond to the CPU load table 131 to the network load table 135. The unit of memory utilization amount and disk utilization amount may not be KB. The unit of disk access band and network access band may not be KB/s.

(Third Input Information: Priority $\alpha_k$)

FIG. 13 is a diagram showing an example of the priority $\alpha_k$, i.e., the third input information. Here, the subscript "$_k$" denotes the resource type. The "priority $\alpha_k$" is specified and input in a format such as, for example, the priority $\alpha_{cpu}$ of CPU utilization amount as 50, the priority $\alpha_{mem}$ of memory utilization amount as 20, the priority $\alpha_{disk}$ of disk utilization amount as 10, the priority $\alpha_{DA}$ of disk access band as 10, and the priority $\alpha_{NA}$ of network access band as 10. In this case, as will be described later in the explanation of operations, if the priority $\alpha_{cpu}$ is "50" and the greatest, the "priority $\alpha_{cpu}$ of CPU utilization rate" has the greatest priority in resource allocation.

As described above, the priority $\alpha$ in allocation respectively exists in the following:
(1) the CPU utilization rate $\alpha_{cpu}$,
(2) the memory utilization amount $\alpha_{mem}$,
(3) the disk utilization amount $\alpha_{disk}$,
(4) the disk access band $\alpha_{DA}$, and
(5) the network access band $\alpha_{NA}$.
Each priority $\alpha$ is compared with other priorities as a ratio of input values.

When the priorities are specified such that
(1) the priority $\alpha_{cpu}$ of CPU utilization rate is 50,
(2) the priority $\alpha_{mem}$ of memory utilization amount is 20,
(3) the priority $\alpha_{disk}$ of disk utilization amount is 10,
(4) the priority $\alpha_{DA}$ of disk access band is 10, and
(5) the priority $\alpha_{NA}$ of network access band is 10,
the ratio becomes "$\alpha_{cpu}:\alpha_{mem}:\alpha_{disk}:\alpha_{DA}:\alpha_{NA}$"="5:2:1:1:1". When "priority $\alpha_k$=0", this indicates that the resource type k is not considered. For example, when "$\alpha_{N,A}$=0", the priority of network access band is not considered.

(S500*b*: Setting of the Allocation Subject List S)

From S500*b*, operations are performed by the allocation unit 120. Next in S500*b*, based on each table of the CPU load table 131, the memory utilization amount table 132, the disk utilization amount table 133, the disk access band table 134, and the network load table 135, the allocation unit 120 calculates each resource utilization amount and sets it in the "allocation subject list S". This will be described in detail later.

(S501: Generation of the Allocation Destination List S')

Next in S501, based on the resource utilization amount of each resource type, such as the CPU utilization amount, the memory utilization amount, etc. set in the "allocation subject list S", the "allocation destination resource capacity P'" (the second input information), and the "priority $\alpha_k$" (the third input information), the allocation unit 120 obtains the initial number n of allocation destinations (destination servers) and generates the "allocation destination list S'" by setting this initial number n and the resource capacities.

FIG. 14 is a diagram showing an example of the "allocation destination list S'". The generation of the "allocation destination list S'" will be described in detail later.

(S502: Calculation of the Total Value $P_{ss, i}$)

In S502, the allocation unit 120 calculates the "total value $P_{ss, i}$" of the resource utilization amounts of each allocation subject (source server) in the "allocation subject list S" shown in FIG. 11. The calculation of the "total value $P_{ss, i}$" will be described in detail later.

(S503: Sorting of the "Allocation Subject List S")

In S503, based on the "total value $P_{ss, i}$" of the resource utilization amounts calculated in S502, the allocation unit 120 sorts the source servers $S_i$ in the "allocation subject list S" in descending order of the "total value $P_{ss, i}$". FIG. 15 shows FIG. 11 after the sorting.

From S504, the allocation unit 120 sequentially allocates each of the sorted source servers $S_i$ to each of the destination servers $S'_j$. In this case, the allocation unit 120 executes an allocation process by selecting each of the source servers $S_i$ in descending order of the total value $P_{ss, i}$.

Thereafter, based on the "allocation subject list S" and the "allocation destination list S'", the allocation unit 120 executes the allocation process of the resource utilization amounts P of the source servers $S_i$ to the destination servers $S'_j$.

(Allocation Process Using the Lists S and S')

First in S504, the allocation unit 120 selects one source server $S_i$ with the greatest total value from the sorted "allocation subject list S". In FIG. 15, for example, the source server $S_3$ is selected first.

Next in S505, the allocation unit 120 selects one allocation destination $S'_j$ from the "allocation destination list S'". In this case, any destination server $S'_j$ can be selected. The destination servers $S'_j$ are selected, for example, in ascending order starting with "j=1".

(S506: Evaluation of Allocatability)

In S506, based on the capacity and the "allocation status" of the allocation destination $S'_j$, the allocation unit 120 evaluates whether the source server $S_i$ can be allocated to the destination server $S'_j$. This will be described in detail later.

(S507: Dispersion Calculation)

If the allocation is possible, in S507 the allocation unit 120 calculates a dispersion $P'_{sd}$ (dispersion value) after the allocation and registers the calculated dispersion $P'_{sd}$ and the combination of the source server $S_i$ and the destination server $S'_j$ in the "allocatable list A". FIG. 16 shows an example of the "allocatable list A". S507 will be described in detail later.

If the allocation is not possible, processing proceeds to S508 instead of S507.

In S508, the allocation unit 120 evaluates whether the "allocation destination list S'" contains any allocation destination S'$_j$ for which allocation has not been tried yet. If yes, processing proceeds to S505, and S506 to S507 are repeated for all the allocation destinations S'$_j$.

The allocation unit 120 tries allocating one source server S$_i$ to all the destination servers S'$_j$ and calculates the dispersion in each case, and then proceeds to S509. In S509, the allocation unit 120 evaluates whether or not the "allocatable list A" is empty. If the "allocatable list A" is not empty, processing proceeds to S510. On the other hand, if the "allocatable list A" is empty, processing proceeds to S511.

In S510, the allocation unit 120 selects from the "allocatable list A" a combination of a source server S$_i$ and a destination server S'$_j$ with the smallest dispersion P'$_{sd}$. Then, the allocation unit 120 determines that the resource utilization amount of the source server S$_i$ of this combination should be allocated to the resource capacity of the destination server S'$_j$ of this combination, and then proceeds to S513.

In S511, since the "allocatable list A" is empty, the allocation unit 120 assumes that the allocation subject S$_i$ cannot be allocated because there is not enough resource capacity in any of the allocation destinations. Thus, the allocation unit 120 adds an allocation destination S'$_{n+1}$, and determines the allocation of the combination of S'$_{n+1}$ and S$_i$ in S512.

In S513, the allocation unit 120 evaluates whether there is any unallocated source server S$_i$ in the "allocation subject list S". If there is, processing proceeds to S504, and S504 to S512 are repeated for all the allocation subjects (source servers). If all the allocation subjects (source servers) have been allocated, processing is terminated.

(S500b in Detail: Setting of Resource Utilization Amounts in the "Allocation Subject List S")

S500b will be described in detail. In S500b, the allocation unit 120 sets resource utilization amounts in the "allocation subject list S". In S500b, the allocation unit 120 sets resource utilization amounts in the "allocation subject list S" input as the first input information. The allocation unit 120 refers to the configuration information table 121 to obtain information on the resource utilization amounts of each allocation subject (source server) from the CPU load table 131, the memory utilization amount table 132, the disk utilization amount table 133, the disk access band table 134, and the network load table 135, and sets the obtained information in the "allocation subject list S". The configuration information table 121 contains entries related to the host (server apparatus), system ID, CPU, etc. The tables 131 to 135 contain entries such as the system ID so that the allocation unit 120 can set utilization amounts in the "allocation subject list S" based on the configuration information table 121 and the tables 131 to 135.

The allocation unit 120 sets a resource utilization amount in each cell of S$_1$ to S$_7$ of the "allocation subject list S" of FIG. 11, for example.

The loads set in the "allocation subject list S" are defined as follows:
(1) the CPU utilization amount: P$_{cpu, i}$,
(2) the memory utilization amount: P$_{mem, i}$,
(3) the disk utilization amount: P$_{disk, i}$,
(4) the disk access band: P$_{DA, i}$, and
(5) the network access band utilization amount: P$_{NA, i}$.

When setting each load in the "allocation subject list S", the allocation unit 120 calculates and sets the maximum, minimum, average, or percentile value of a particular period among the data accumulated in each of the tables 131 to 135.

For example, this is done as follows:
(1) In the CPU load table 131 of FIG. 5, the sum of the "CPU utilization rate (USER)" and the "CPU utilization rate (SYSTEM)" is used as the CPU utilization rate P$_{cpu, i}$ (utilization amount). Since the CPU utilization rate does not take into account differences in CPU performance, a value further taking into account a CPU performance value is set as the CPU utilization amount.
(2) As the memory utilization amount P$_{mem, i}$, the "memory utilization amount" value in the memory utilization amount table 132 of FIG. 6 is set.
(3) As the disk utilization amount P$_{disk, i}$, the "disk utilization amount" value in the disk utilization amount table 133 of FIG. 7 is set.
(4) As the disk access band P$_{DA, i}$, the sum of the "disk read speed" and the "disk write speed" in the disk access band table 134 of FIG. 8 is set.
(5) As the network access band P$_{NA, i}$, the sum of the "network transmission speed" and the "network reception speed" in the network load table 135 of FIG. 9 is set.

(S501 in Detail: Generation of the "Allocation Destination List S'")

S501 will be described in detail. In S501, the allocation unit 120 generates the "allocation destination list S'" of FIG. 14. Based on the "allocation destination resource capacity P'" (the second input information) and the sum of the resource utilization amounts (loads) set in the "allocation subject list S", the allocation unit 120 calculates the initial value n of the number of allocation destinations (destination servers). The allocation unit 120 first calculates the initial number n' of destination servers for each type of resource utilization amount, such as the CPU utilization amount and the memory utilization amount, and then determines the initial number n of destination servers based on the priority α of each resource type. Specifically, this is done as follows. For example, based on (Equation 1) below, the allocation unit 120 calculates the initial number n'$_{cpu}$ of destination servers determined by the CPU utilization amount.

[Math. 1]

$$n'_{cpu} = \left(\sum_{i=1}^{m} P_{cpu,i}\right) \bigg/ P'_{cpu,limit} \quad (1)$$

As shown in (Equation 1), the allocation unit 120 calculates n'$_{cpu}$ by dividing the sum of the CPU loads in the "allocation subject list S" by the capacity P'$_{cpu, limit}$ of the allocation destination in the "allocation destination resource capacity P'" (the second input information). The numerator of (Equation 1) is the sum of the CPU utilization amount P$_{cpu, i}$ column in FIG. 11. The denominator P'$_{cpu, limit}$ is the "CPU capacity P'$_{cpu, limi}$" in the "allocation destination resource capacity P'", i.e., the second input information (FIG. 12). In addition to the CPU utilization amount, the allocation unit 120 also obtains, by similar calculations, the required number n' of destination servers based on the loads of each resource type. That is, the allocation unit 120 calculates the following:
(1) n'$_{cpu}$,
(2) n'$_{mem}$,
(3) n'$_{disk}$,
(4) n'$_{DA}$, and
(5) n'$_{NA}$.

(Determination of the Initial Number n of Destination Servers Considering Priorities)

From the numbers n' calculated from the loads of the respective resource types, the allocation unit 120 determines the number n' of the load (resource type) with the greatest priority α as the initial number n of destination servers. That is, among n'$_{cpu}$ and other numbers n', the n' with the greatest priority is identified. If there is one number n' with the greatest priority, the n' of the resource type of that priority is determined as the initial number n of destination servers. On the other hand, if there is a plurality of numbers n' with the greatest priority, the allocation unit 120 determines the n' having the greatest value among those with the same priority as the initial number n of destination servers, as shown in (Equation 2) below. (Equation 2) assumes that $n'_{cpu}$ and $n'_{mem}$ have the same and greatest priority.

$$n = \max(n'_{cpu}, n'_{mem}) \qquad (2)$$

For example, when the priorities are

"$\alpha_{cpu} : \alpha_{mem} : \alpha_{disk} : \alpha_{DA} : \alpha_{NA}$"="5:5:1:1:1", "$n'_{cpu}$" and "$n'_{mem}$" corresponding to $\alpha_{cpu}$ and $\alpha_{mem}$ are adopted by evaluation on a priority basis. Then, based on (Equation 2) above, the n' having a greater value is finally adopted as the initial number n of destination servers.

When the initial number n of destination servers has been determined, the allocation unit 120 generates the "allocation destination list S'". The "allocation destination list S'" is a list composed of n destination servers $S'_j$ (j=1 to n, m>n) determined as described above. As shown in FIG. 14, the n destination servers $S'_j$ determined as described above and their resource capacities are set in the "allocation destination list S'". In this case, as shown in FIG. 14, each capacity of the "allocation destination resource capacity P'", i.e., the second input information, is set as each resource capacity. FIG. 14 shows a case where the initial number n of destination servers is determined as "n=3".

(S502: Calculation of the Total Value $P_{ss,\,i}$)

S502 will be described in detail. In S502, the allocation unit 120 calculates the "total value $P'_{ss,\,i}$" of the resource utilization amounts in the "allocation subject list S" of FIG. 11. The "total value $P'_{ss,\,i}$" of the resource utilization amounts is obtained by calculating the deviation value of the resource utilization amount of a given allocation subject server $S_i$ for each resource type, such as the CPU load, the memory utilization amount, the disk utilization amount, the disk load, and the network load, and obtaining the sum of the calculated deviation values weighted by their respective priorities. Since the resource utilization amounts are measured in different units, they cannot simply be added. For this reason, the deviation values are obtained such that the average of the resources is 0 and the standard deviation is 1 in the population of all the source servers $S_i$ to be allocated. Then, the sum of these deviation values is used as the "total value of the resource utilization amounts". Thus, the total value $P_{ss,\,i}$ is a summary value of the sum of the resource utilization amounts of each source server $S_i$.

For example, when the resources to be considered are limited to three (limited to three dimensions), i.e., the CPU load (CPU utilization amount), the memory utilization amount, and the disk utilization amount, the total value $P_{ss,\,i}$, i.e., the "sum of the resource utilization amounts" of the source server $S_i$, is obtained as follows. First, by (Equation 3) and (Equation 4) below, the allocation unit 120 obtains the average $P_{cpu,\,avg}$ and the standard deviation $P_{cpu,\,sd}$ of the CPU loads in the consolidation subject servers. Likewise, the allocation unit 120 obtains the average and the standard deviation of the memory utilization amounts and the disk utilization amounts, respectively.

[Math. 2]

$$P_{cpu,avg} = (1/m)\sum_{i=1}^{m} P_{cpu,i} \qquad (3)$$

$$P_{cpu,sd} = \sqrt{(1/m)\sum_{i=1}^{m}(P_{cpu,avg} - P_{cpu,i})^2} \qquad (4)$$

(Consideration of the Priorities in the Total Value)

At this time, the total value $P_{ss,\,i}$, i.e., the "sum of the resource utilization amounts" of a given source server $S_i$ is obtained as shown in (Equation 5) to (Equation 7) and (Equation 8), where $\alpha_{cpu}$ is the priority of CPU load, $\alpha_{mem}$ is the priority of memory utilization amount, and $\alpha_{disk}$ is the priority of disk load. That is, as shown in (Equation 8), the total value $P_{ss,\,i}$ is obtained by multiplying the deviation value of each load by a weight (the priority of each load) and adding all the multiplied results. Generally, deviation values are calculated such that the average is 50 and the standard deviation is 10. Here, however, deviation values, etc. are calculated such that the average is 0 and the standard deviation is 1 to avoid unnecessary calculations.

$$P_{cpu,score,i} = (P_{cpu,i} - P_{cpu,avg})/P_{cpu,sd} \qquad (5)$$

$$P_{mem,score,i} = (P_{mem,i} - P_{mem,avg})/P_{mem,sd} \qquad (6)$$

$$P_{disk,score,i} = (P_{disk,i} - P_{disk,avg})/P_{disk,sd} \qquad (7)$$

$$P_{ss,i} = \alpha_{cpu} \times P_{cpu,score,i} + \alpha_{mem} \times P_{mem,score,i} + \alpha_{disk} \times P_{disk,score,i} \qquad (8)$$

Next in S503, the allocation unit 120 sorts the source servers $S_i$ in the "allocation subject list S" in descending order of the total value $P_{ss,\,i}$, as shown in FIG. 15.

In the steps up to S503 described above, the "allocation subject list S" and the "allocation destination list S'" are prepared. From S504, the allocation unit 120 executes the allocation process of the source servers $S_i$, using the "allocation subject list S" and the "allocation destination list S'". Specifically, as shown in the flowchart of FIG. 10, the allocation unit 120 fixes i and changes j, and selects the "source servers $S_i$" one after another. That is, the allocation unit 120 selects one source server $S_i$ and checks the allocation condition when this source server $S_i$ is allocated to the destination servers $S'_{j=1}$ to $S'_{j=n}$ (S506, S507). Then, the allocation unit 120 selects another source server $S_i$ in descending order of the total value.

(Processing from S504)

The processing from S504 will be described. In the explanation given below, reference will be made to the sorted "allocation subject list S" of FIG. 15 and the "allocation destination list S'" of FIG. 14.

In S504, the allocation unit 120 selects a source server $S_i$ from the "allocation subject list S". When selecting one source server $S_i$ from the "allocation subject list S", the allocation unit 120 starts by selecting the one with the greatest total value, as described previously. In FIG. 15, the allocation unit 120 first selects $S_3$, and then selects "$S_1, S_5, \ldots$" sequentially.

In S505, the allocation unit 120 selects one destination server $S'_j$ from the "allocation destination list S'". In the example of FIG. 14, the allocation unit 120 first selects, for example, the destination server $S'_1$, and then selects "j=2, 3" sequentially.

(S506 in Detail: Determination of Allocatability)

S506 will be described in detail. In S506, based on the resource capacity P' (upper limit) of the destination server S'$_j$ and the current "allocation state" of resource utilization amounts of the destination server S'$_j$, whether the source server S$_i$ can be allocated to the destination server S'$_j$ is evaluated. In the case of FIG. 14 and FIG. 15, the allocation unit 120 first evaluates whether the source server S$_3$ can be allocated to the destination server S'$_1$. In the evaluation of S506, it is evaluated whether the total utilization amount of each resource of the destination server S'$_j$ is below each resource capacity when the utilization amount of the source server S$_i$ is allocated to the destination server S'$_j$. That is, the allocation unit 120 obtains from the "allocation destination list S'" of FIG. 14 each resource capacity of the allocation destination S'$_j$, such as the CPU resource capacity P'$_{cpu, \text{limit } j}$,
the memory resource capacity P'$_{mem, \text{limit } j}$, and
the disk resource capacity P'$_{disk, \text{limit } j}$, and evaluates whether each of the conditions of (Equation 9) to (Equation 11) below is satisfied.

$$P'_{cpu,j} \leq P'_{cpu,limit,j} \quad (9)$$

$$P'_{mem,j} \leq P'_{mem,limit,j} \quad (10)$$

$$P'_{disk,j} \leq P'_{disk,limit,j} \quad (11)$$

(Equation 9) will be described by way of example.

When the source server is S$_3$ and the destination server is S'$_1$, "P'$_{cpu, limit, j}$" on the right side of the equation is the "upper limit of CPU utilization rate" of the destination server S'$_1$. "P'$_{cpu,j}$" on the left side of the equation is the "CPU utilization amount" of the destination server S'$_1$, assuming that the CPU utilization amount (CPU utilization rate) of the source server S$_3$ has been allocated to the "current CPU utilization amount" of the destination server S'$_1$. The above-mentioned "current CPU utilization amount" is the total CPU utilization amount currently allocated to the destination server S'$_1$ when an allocation is determined in S510. Each time an allocation to the destination server S'$_j$ is determined, the allocation unit 120 stores the allocation amount and obtains the total amount. This allows the allocation unit 120 to make the evaluation of (Equation 9). If processing is started with no resource allocated to the destination servers S'$_1$ to S'$_3$, "P'$_{cpu, 1}$=0" in S506 so that (Equation 9) holds true. The same applies to (Equation 10) and (Equation 11).

(S507 in Detail)

Next, S507 will be described in detail. In S507, the "dispersion P'$_{sd}$" of the destination server S'$_j$ is calculated, assuming that the source server S$_i$ (S$_3$) is allocated to the destination server S'$_j$ (S'$_1$). Then, the allocation unit 120 registers the "dispersion P'$_{sd}$" and the combination of the source server S$_i$ and the destination server S'$_j$ in the "allocatable list A" shown in FIG. 16.

For example, when the resource types to be considered are limited to three resources, i.e., the CPU load, the memory utilization amount, and the disk utilization amount, the "dispersion P'$_{sd}$" (dispersion value) is obtained by (Equation 12) to (Equation 14) below.

[Math. 3]

$$P'_{cpu,avg} = (1/n)\sum_{j=1}^{n} P'_{cpu,j} \quad (12)$$

$$P'_{cpu,sd} = \sqrt{(1/n)\sum_{j=1}^{n} (P'_{cpu,avg} - P'_{cpu,j})^2} \quad (13)$$

$$P'_{sd} = \alpha_{cpu} \times [P'_{cpu,sd} / P'_{cpu,avg}] + \alpha_{mem} \times [P'_{mem,sd} / P'_{mem,avg}] + \alpha_{disk} \times [P'_{disk,sd} / P'_{disk,avg}] \quad (14)$$

The CPU utilization amount P'$_{cpu,j}$, the memory utilization amount P'$_{mem,j}$, and the disk utilization amount P'$_{disk,j}$ are the resource utilization amounts of the allocation destination S'$_j$. Here, when the set of the allocation subjects (source servers) to be allocated to S'$_j$ is defined as X$_j$, the resource utilization amount of the allocation destination S'$_j$ is defined as the sum of the resource utilization amounts of each resource type of the allocation subject servers S$_i$ (∈X$_j$). In the case of the destination server S'$_j$ to be calculated, the resource utilization amount is obtained by adding the current resource utilization amount and the resource utilization amount of the source server S$_i$ to be processed. For example, P'$_{cpu, 1}$ of (Equation 12) is the same as P'$_{cpu, 1}$ of (Equation 9).

As shown in (Equation 12) to (Equation 14), the "dispersion P'$_{sd}$" is a quantified dispersion state of the resource utilization amounts in all the allocation destinations that is obtained by calculating the standard deviation (sd) and average (agv) of the utilization amounts of each resource type in all the destination servers, calculating the dispersion (coefficient of variation) of each resource type, multiplying each obtained dispersion by the priority α of the same resource type, and adding all the multiplied results. The smaller the "dispersion P'$_{sd}$", the more equally the resource utilization amounts are distributed among the allocation destinations. If the resource utilization amounts are distributed completely equally, the "dispersion P'$_{sd}$" becomes 0.

When three types of resources are to be considered as mentioned above, the "dispersion P'$_{sd}$" is calculated by first obtaining the average "P'$_{cpu, avg}$" of the CPU loads among the allocation destinations by (Equation 12) and then obtaining the "standard deviation P'$_{cpu, sd}$" by (Equation 13). The same applies to the memory utilization amount and the disk utilization amount.

Then, using (Equation 14), the "dispersion P'$_{sd}$" is obtained from the standard deviation and the weight of each resource type. Since the standard deviation of each resource type is on a different scale, it is divided by each average value to calculate the "coefficient of variation". The coefficient of variation is a value derived from the ratio of the average to the standard deviation. Then, each coefficient of variation and the priority α of the corresponding resource type are multiplied and all the multiplied results are added. Generally, the coefficient of variation is expressed as a percentage by dividing the standard deviation by the average and multiplying the result by 100. Here, the standard deviation is simply divided by the average to avoid unnecessary calculations.

The calculation of the "dispersion P'$_{sd}$" using (Equation 12) to (Equation 14) will be described in more detail, assuming that S505 to S508 are performed in a loop. In the explanation below, it is assumed that the "allocation destination list S'" and the "allocation subject list S" of FIG. 14 and FIG. 15 are used and that three types of resources, i.e., the CPU load, the memory utilization amount, and the disk utilization amount, are allocated to destination servers. In the explanation below, the allocation of the CPU utilization amount will be explained, but the same applies to other resource types such as the memory utilization amount.

In this explanation, reference will be made to FIG. 17 to FIG. 20.

In S504, the allocation unit 120 selects the source server $S_3$ from the "allocation subject list S".

In S505, the allocation unit 120 selects the destination server $S'_1$ from the "allocation destination list S".

In S506, the allocation unit 120 evaluates whether the allocation can be made. In this case, it is assumed that the destination server S'1 has no allocated resources and the YES branch is taken in S506.

In S507, the allocation unit 120 calculates the "dispersion $P'_{sd}$" based on (Equation 12) to (Equation 14). FIG. 17 is a diagram for explaining calculations when "i=3, j=1 to 3".

(i=3, j=1)

In S507 (j=1), the allocation unit 120 calculates the "dispersion $P'_{sd}$" when each resource utilization amount of the source server $S_3$, such as the memory utilization amount or the disk utilization amount, is tentatively allocated to the destination server $S_1$, as described below As shown in "j=1" of FIG. 17, the allocation unit 120 calculates the average "$P'_{cpu, avg}$" of the CPU utilization amounts of the destination servers $S'_1$ to $S'_3$ when the CPU utilization amount <P3> of the source server $S_3$ is allocated to the destination server $S'_1$. When "j=1", the right side of "$P_{cpu, avg}$" is 0 except for "$P'_{cpu, 1}$". Next, based on the "$P'_{cpu, avg}$", the allocation unit 120 calculates the standard deviation "$P'_{cpu, sd}$" of the CPU utilization amounts of the destination servers $S'_1$ to $S'_3$. The allocation unit 120 calculates the "dispersion $P'_{sd}$" by calculating, for each resource type, the "coefficient of variation" from the standard deviation and the average, multiplying each priority and each coefficient of variation, and adding all the multiplied results, and registers the "dispersion $P'_{sd}$" in the "allocatable list A".

(i=3, j=2)

In FIG. 17, "j=2" shows the next processing in the loop of S507. In "j=2", the allocation unit 120 calculates the "dispersion $P'_{sd}$" when each resource utilization amount of the source server $S_3$ is tentatively allocated to the destination server $S'_2$. As shown in FIG. 17, this time the allocation unit 120 calculates the "dispersion $P'_{sd}$" when the CPU utilization amount <P3> of the source server $S_3$ is tentatively allocated to the destination server $S'_2$. The dispersion "$P'_{sd}$" is calculated in the same way as in "j=1". The allocation unit 120 registers the result in the "allocatable list A".

(i=3, j=3)

In FIG. 17, "j=3" shows the processing when "j=3" in S507. In "j=3", the allocation unit 120 calculates the "dispersion $P'_{sd}$" when each resource utilization amount of the source server $S_3$ is tentatively allocated to the destination server $S'_3$. As shown in FIG. 17, this time the allocation unit 120 calculates the "dispersion $P'_{sd}$" when the CPU utilization amount <P3> of the source server $S_3$ is tentatively allocated to the destination server $S'_3$. The dispersion "$P'_{sd}$" is calculated in the same way as in "j=1". The allocation unit 120 registers the result in the "allocatable list A".

When the processing of j=3 is finished, the YES branch is taken in S508 to proceed to S509. In S509, since data has been registered to the "allocatable list A", processing proceeds to S510. The "allocatable list A" contains the results of j=1 to j=3. In FIG. 17, the value of the dispersion "$P'_{sd}$" is the same for all of j=1 to j=3, so that in S510 the allocation unit 120 determines, for example, the destination server $S'_1$ as the allocation destination of the source server $S_3$. (Since the dispersion "$P'_{sd}$" value is the same, any destination server may be used.)

(i=1, j=1)

Then, processing proceeds to S513. Since j=1 to j=3 have been processed, processing returns to S504. In S504, the source server $S_1$ is selected. In S505, the destination server $S'_1$ is selected. FIG. 18 is a diagram for explaining calculations when "i=1, j=1 to 3". In "i=3", the allocation of the source server $S_3$ to the destination server $S'_1$ has been determined. In FIG. 18, therefore, "P3" is outlined by a square to indicate that it has been determined. When "j=1", as with "j=1" of FIG. 17, the allocation unit 120 calculates the "dispersion $P'_{sd}$" when each resource utilization amount of the source server $S_1$ is tentatively allocated to the destination server $S'_1$. As shown in FIG. 18, this time the allocation unit 120 calculates the "dispersion $P'_{sd}$" when the CPU utilization amount <P1> of the source server $S_1$ is tentatively allocated to the destination server $S'_1$. The dispersion "$P'_{sd}$" is calculated as explained in FIG. 17. The allocation unit 120 registers the result in the "allocatable list A".

(i=1, j=2)

In FIG. 18, "j=2" shows the processing in the loop of "j=2" in S507. In "j=2", the allocation unit 120 calculates the "dispersion $P'_{sd}$" when each resource utilization amount of the source server $S_1$ is tentatively allocated to the destination server $S'_2$. As shown in FIG. 18, this time the allocation unit 120 calculates the "dispersion $P'_{sd}$" when the CPU utilization amount <P1> of the source server $S_1$ is tentatively allocated to the destination server $S'_2$. The dispersion "$P'_{sd}$" is calculated in the same way as in "j=1". The allocation unit 120 registers the result in the "allocatable list A".

(i=1, j=3)

In FIG. 18, "j=3" shows the processing in the loop of "j=3" in S507. In "j=3", the allocation unit 120 calculates the "dispersion $P'_{sd}$" when each resource utilization amount of the source server $S_1$ is tentatively allocated to the destination server $S'_3$. As shown in FIG. 18, this time the allocation unit 120 calculates the "dispersion $P'_{sd}$" when the CPU utilization amount <P1> of the source server $S_1$ is tentatively allocated to the destination server $S'_3$. The dispersion "$P'_{sd}$" is calculated in the same way as in "j=1". The allocation unit 120 registers the result in the "allocatable list A".

As with "j=3", processing proceeds to S510. In S510, the destination servers $S'_2$ and $S'_3$ to which no allocation has been made have the smallest dispersion "$P'_{sd}$". The allocation unit 120 allocates the source server $S_1$ to the destination server $S'_2$.

(i=5, j=1 to 3)

As described above, processing returns to S504 from S513. In S504, the source server $S_5$ is selected. In S505, the destination server $S'_1$ is selected. FIG. 19 is a diagram for explaining calculations when "i=5, j=1 to 3". In "i=3", the allocation of the source server $S_3$ to the destination server $S'_1$ has been determined. In "i=1", the allocation of the source server $S_1$ to the destination server $S'_2$ has been determined. In FIG. 19, therefore, "P3" and "P1" are outlined by a square to indicate that the allocation has been determined. In FIG. 19, the contents of "j=1 to 3" are the same as in FIG. 17 and FIG. 18.

As with "i=1", processing proceeds to S510. In S510, the destination server $S'_3$ to which no allocation has been made has the smallest dispersion "$P'_{sd}$". The allocation unit 120 allocates the source server $S_5$ to the destination server $S'_3$.

(i=2, j=1 to 3)

As described above, processing returns to S504 from S513. In S504, the source server $S_2$ is selected. In S505, the destination server $S'_1$ is selected. FIG. 20 is a diagram for explaining calculations when "i=2, j=1 to 3". In "i=3", the allocation of the source server $S_3$ to the destination server $S'_1$ has been determined. In "i=1", the allocation of the source server $S_1$ to the destination server $S'_2$ has been determined. In "i=5", the allocation of the source server $S_5$ to the destination server $S'_3$ has been determined. In FIG. 20, therefore, the CPU utilization amounts "P3", "P1", and "P5" are outlined by a square to indicate the allocation has been determined. In FIG. 20, the contents of "j=1 to 3" are the same as in FIG. 17 to FIG. 19.

As with "i=5", processing proceeds to S510. In S510, the allocation unit 120 allocates the source server $S_2$ to a destination server S' with the smallest dispersion "P'$_{sd}$".

Hereinafter, the same processing is executed for the allocation of the remaining source servers $S_7$, $S_4$, and $S_6$. The above example has explained the calculations when the resources to be considered are limited to three types, i.e., the CPU utilization amount, the memory utilization amount, and the disk utilization amount. The same calculations can be used to consider the disk access band and the network access band.

In the first embodiment above, the resource allocation apparatus 100 has been described. A "resource allocation method" performed by the resource allocation apparatus 100 may also be considered as an embodiment. Alternatively, a "resource allocation program" that causes a computer to execute the resource allocation apparatus 100 may be considered as an embodiment. Further, a computer executable "recording medium" recording the "resource allocation program" may be considered as an embodiment.

The resource allocation apparatus 100 of the first embodiment calculates the total value from the deviation values of resource utilization amounts with consideration given to the priorities, and determines the order in which each source server is allocated based on the total value. Then, the allocation unit 120 further calculates the "dispersion P'$_{sd}$" of the resource utilization amounts when allocated with consideration given to the priority α. The allocation unit 120 determines a combination of a source server and a destination server that minimizes the "dispersion P'$_{sd}$". This makes it possible to calculate a combination that allocates the resource utilization amounts equally. Further, by considering the priorities, combinations can be calculated flexibly.

Embodiment 2

In the first embodiment, it is not assumed that each resource has a plurality of devices such as, for example, CPUs, and each device has an independent load. In a second embodiment, a case will be described where the load of each device is considered when each resource has a plurality of devices. The second embodiment will be described using a plurality of CPUs as an example. Although CPUs will be discussed hereinafter, a plurality of devices may similarly be supported for other resources.

In the second embodiment, a CPU load table 131-1 stores the load of each CPU device, as shown in FIG. 21.

FIG. 22 is a flowchart showing operations of the second embodiment. In the flowchart of FIG. 22, S600 to S608 are added to the flowchart of FIG. 10. In the first embodiment, in S506 an evaluation is made simply by performing additions. In the second embodiment, on the other hand, the allocation unit 120 further considers, by steps shown as "Step 600 to Step 608" in FIG. 22, the utilization amounts of the individual CPUs of an allocation subject (source server) and an allocation destination (destination server) to evaluate whether or not the allocation is possible. Each CPU is allocated such that the utilization amounts of the allocation subject and the allocation destination are complementary to each other. That is, the allocation unit 120 combines a CPU of the allocation subject with a large CPU utilization amount and a CPU of the allocation destination with a small CPU utilization amount. In this way, allocations can be made such that the utilization amounts of the CPUs are evenit distributed in the allocation destination after allocation.

(CPUs of a Source Server)

The number of CPUs in the source server $S_i$ is defined as $N_i$.

Each CPU in the source server $S_i$ is defined as "$S_{i, cpu, k}$" (k=1 to $N_i$).

The CPU utilization amount of each CPU is defined as "$P_{cpu, each, i, k}$".

(CPUs of a Destination Server)

The number of CPUs in an allocation destination (destination server) is defined as $N'_j$.

Each CPU in the destination server $S'_j$ is defined as "$S'_{cpu, l}$" (l=1 to $N'_j$).

The CPU utilization amount of each CPU is defined as "$P'_{cpu, each, j, l}$".

Whether the allocation subject server $S_i$ can be allocated to the allocation destination server $S'_j$ is determined in the following steps, which are processed by the allocation unit 120.

(1) First in Step 600, each CPU, $S_{i, cpu}$, of the allocation subject $S_i$ is reordered in descending order of the utilization amount $P_{cpu, each, i}$.

(2) In Step 601, k is set to 1.

(3) In Step 602, each CPU, $S'_{j, cpu}$, of the allocation destination $S'_j$ is reordered in ascending order of the utilization amount $P'_{cpu, j}$.

(4) In Step 603, l is set to 1.

(5) In Step 604, it is evaluated whether the sum of $P_{cpu, each, i, k}$ and $P'_{cpu, each, j, l}$ exceeds $P'_{cpu\ limit}$. If the sum exceeds $P'_{cpu, limit}$, it is determined that the allocation of $S_{i, cpu}$ (the source server's CPU) to $S'_{j, cpu}$ (the destination server's CPU) has failed and that the allocation of the source server $S_i$ to the destination server $S'_j$ has also failed, and processing proceeds to Step 508.

(6) If the sum does not exceed $P'_{cpu, limit}$, processing proceeds to Step 605, and k and l are incremented by 1.

(7) In Step 606, if l does not exceeds the number $N'_j$ of CPUs, processing proceeds to Step 608 to evaluate whether k exceeds the number $N'_i$ of CPUs. If k does not exceeds $N'_i$, this indicates that there is an unallocated $S_{i, cpu}$ (the source server's CPU), so that processing proceeds to Step 604. If k exceeds $N'_i$, this indicates that all $S_{i, cpu}$ (the source server's CPUs) have been allocated, so that the combination of $S_{i, cpu}$ (the source server's CPU) and $S'_{j, cpu}$ (the destination server's CPU) is added to the "allocatable list A", and processing proceeds to Step 507.

(8) In Step 606, if l exceeds the number $N'_j$ of CPUs (only when $N_i > N'_j$), processing proceeds to Step 607, and the allocation to $S'_{j, cpu}$ (the destination server's CPU) is tentatively reflected, and reordering is done again in Step 602.

FIG. 23 shows allocations when $N_i < N'_j$ (the number of the source server's CPUs < the number of the destination server's CPUs). FIG. 23 shows the CPUs of the source server and the destination server after being sorted by the CPU utilization amount. In the figure, shaded portions indicate the CPU utilization amounts. In this case, CPU2 (with the greatest utilization amount) of the allocation subject is allocated to CPU4 (with the smallest utilization amount) of the allocation destination. CPU1 of the allocation subject is allocated to CPU2 of the allocation destination.

FIG. 24 shows allocations when $N_i > N'_j$ (the number of the source server's CPUs > the number of the destination server's CPUs). As with FIG. 23, FIG. 24 shows the CPUs of the source server and the destination server after being sorted by the CPU utilization amount. In this case, CPU4 (with the greatest utilization amount) of the allocation subject is first allocated to CPU2 (with the smallest utilization amount) of the allocation destination. CPU1 of the allocation subject is allocated to CPU1 of the allocation destination. Then, these allocations are tentatively reflected (Step 607), and the CPUs of the allocation destination are reordered. CPU2 of the allocation subject is allocated to CPU1 (with the smallest utilization amount), and CPU3 of the allocation subject is allocated to CPU2 of the allocation destination.

In the second embodiment, in determining an allocation in Step 510, consideration is also given to combinations of allocated CPUs added to the allocatable list.

In the first embodiment, the resource utilization amounts of a plurality of CPUs are calculated with their average. For example, suppose that whether an allocation subject with two CPUs can be allocated to an allocation destination with two CPUs is evaluated by obtaining the total CPU utilization amounts of the allocation destination and the allocation subject. In the first embodiment, the results are as shown in FIG. 25. Since the utilization amount of each CPU of the allocation destination is considered based on the average, both CPUs are considered as 50%. Likewise, in the allocation subject, both CPUs are considered as 40%. The allocation in this case results in 90%. Thus, it is under 100% and the allocation is possible. In actuality, however, the CPU utilization amounts are distributed unequally in the allocation subject, being 10% and 70%, as shown in FIG. 26. Thus, the allocation is not possible. In the second embodiment, the flow in FIG. 22 makes it possible to accurately evaluate whether the allocation is possible, taking into account a plurality of devices.

BRIEF DESCRIPTION OF DRAWINGS

FIG. 4 is a configuration information table 121 of the first embodiment.

FIG. 5 is a CPU load table 131 of the first embodiment.

FIG. 6 is a memory utilization amount table 132 of the first embodiment.

FIG. 7 is a disk utilization amount table 133 of the first embodiment.

FIG. 8 is a disk access band table 134 of the first embodiment.

FIG. 9 is a network load table 135 of the first embodiment.

FIG. 11 is an allocation subject list S of the first embodiment.

FIG. 13 is a priority α of the first embodiment.

FIG. 14 is an allocation destination list S' of the first embodiment.

FIG. 15 is a sorted allocation subject list S of the first embodiment.

FIG. 16 is an allocatable list A of the first embodiment

FIG. 17 is a diagram explaining a calculation method of a dispersion $P_{sd}$ of the first embodiment.

FIG. 18 is a diagram explaining the calculation method of the dispersion $P_{sd}$ of the first embodiment.

FIG. 19 is a diagram explaining the calculation method of the dispersion $P_{sd}$ of the first embodiment.

FIG. 20 is a diagram explaining the calculation method of the dispersion $P_{sd}$ of the first embodiment.

FIG. 21 is a diagram showing a CPU load table 131-1 of the second embodiment.

REFERENCE SIGNS LIST

Figure 1:
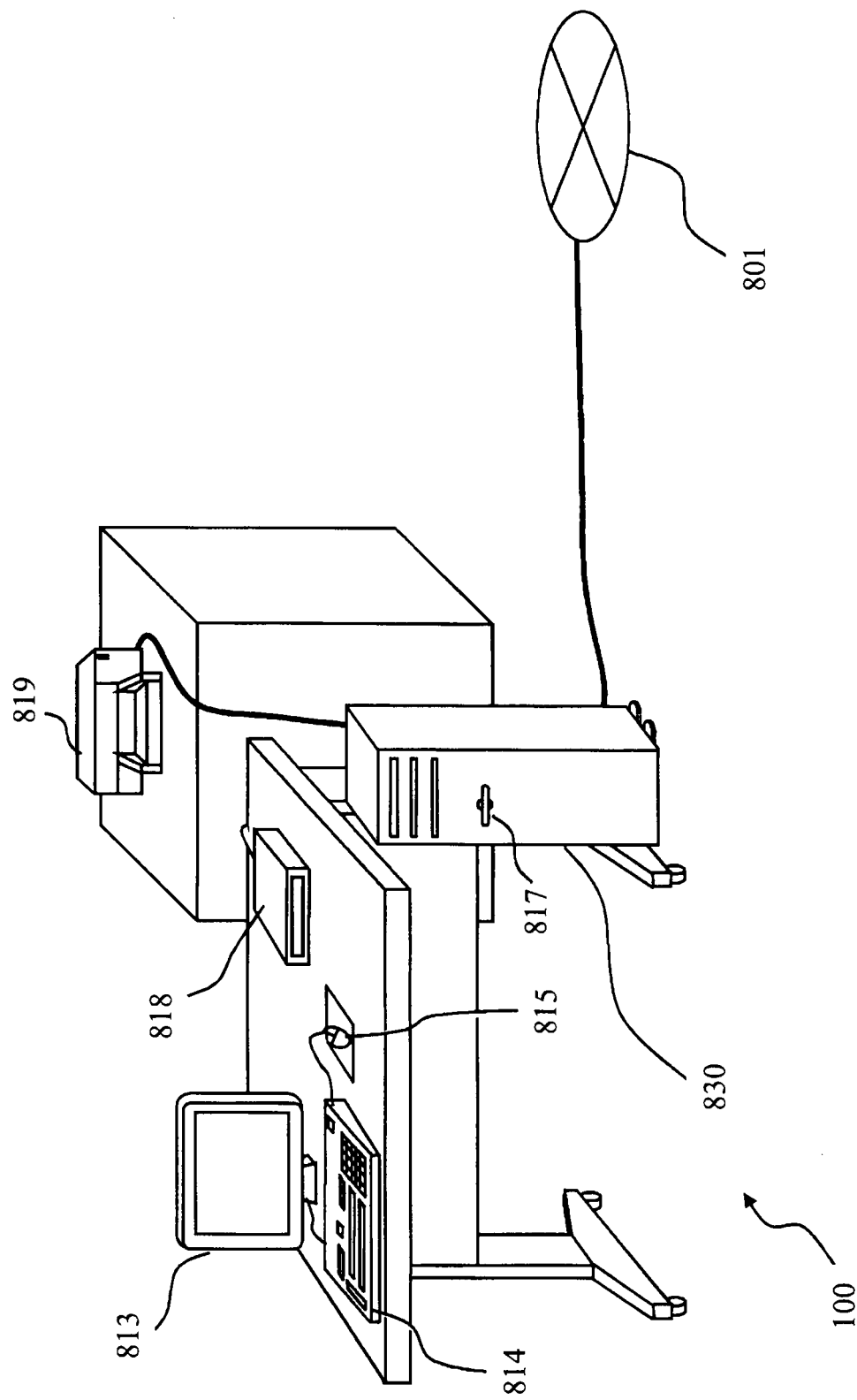
FIG. 1 is an external view of a resource allocation apparatus 100 of the first embodiment.
Figure 2:
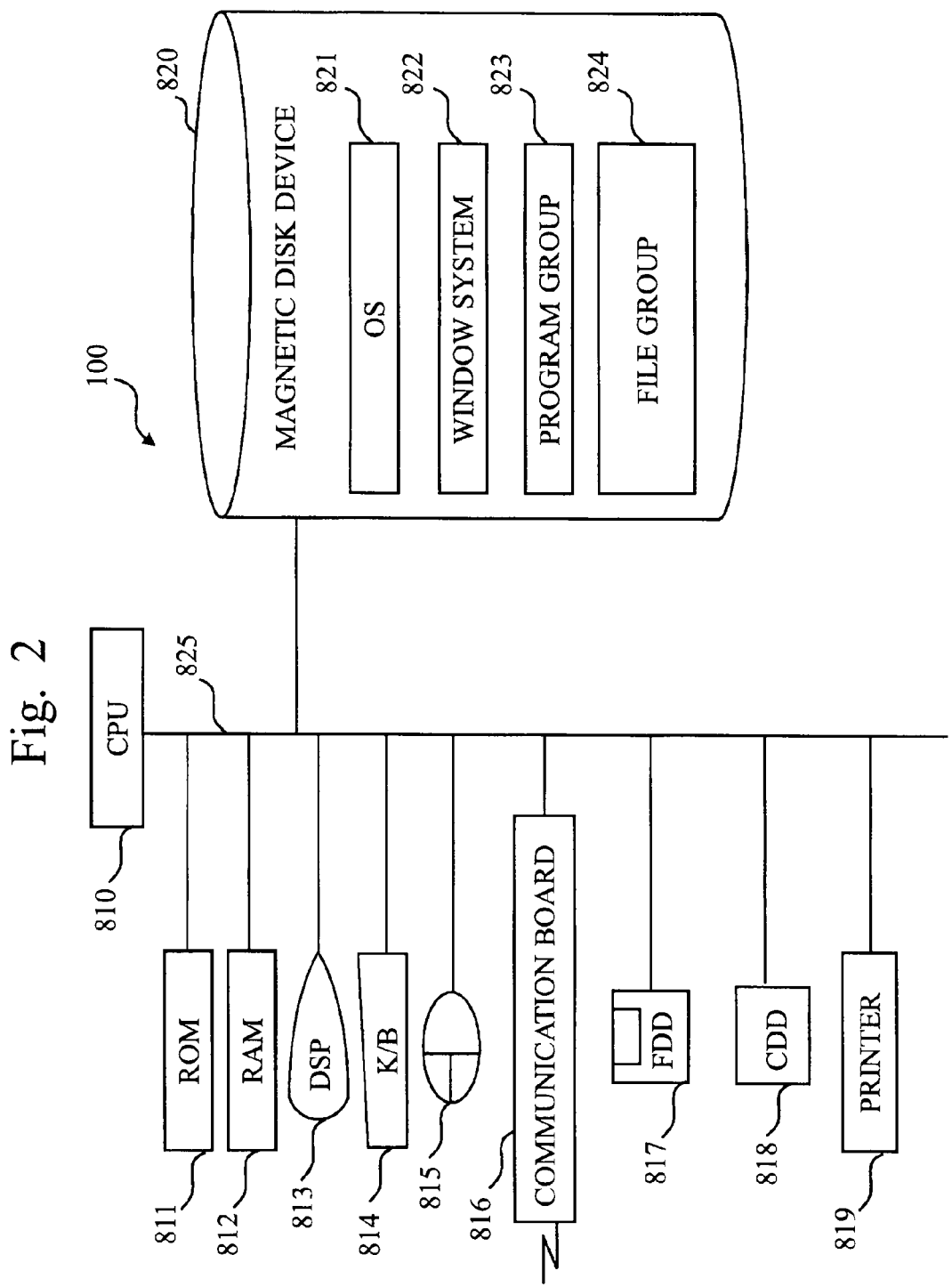
FIG. 2 is a hardware configuration of the resource allocation apparatus 100 of the second embodiment.
Figure 3:
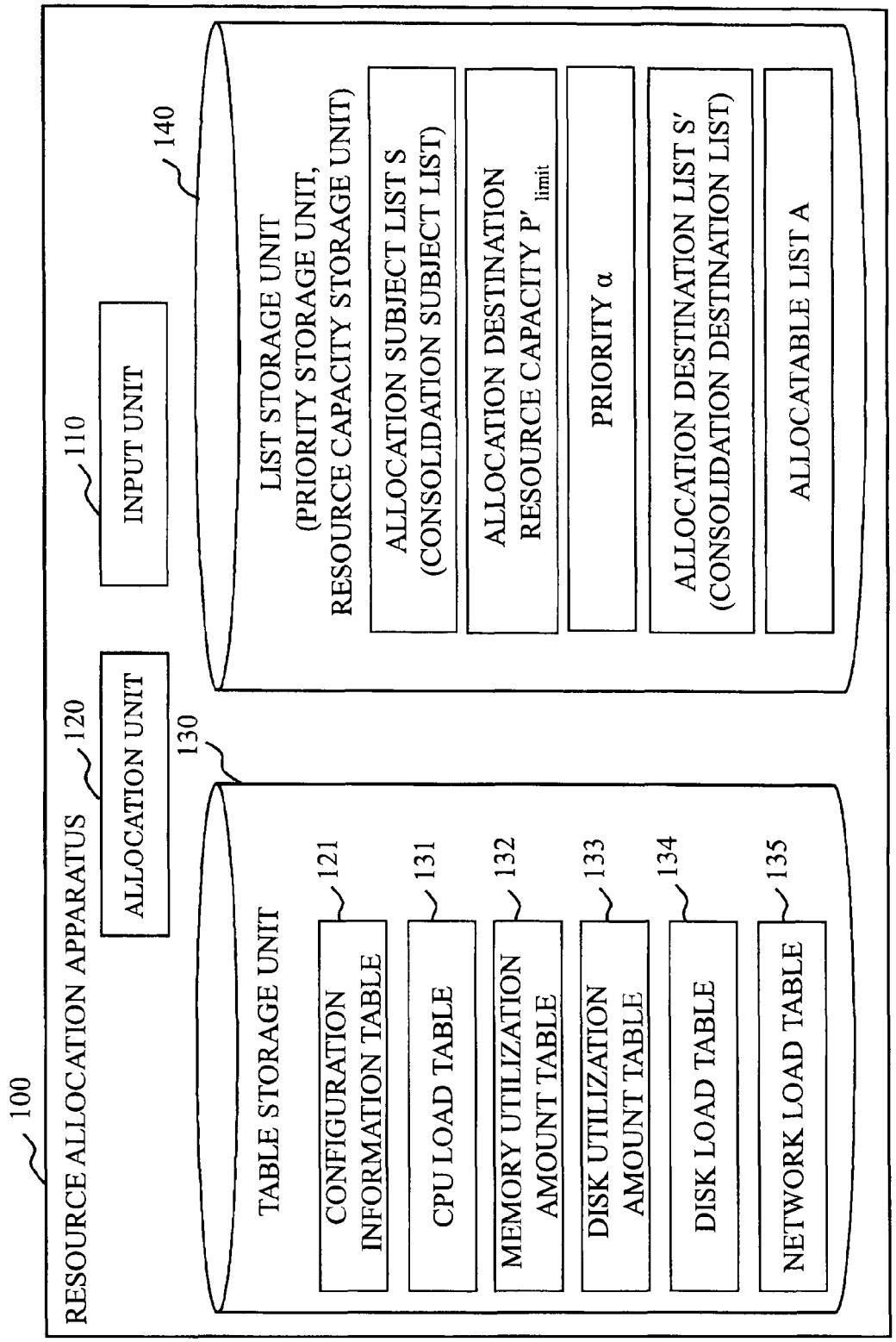
FIG. 3 is a block diagram of the resource allocation apparatus 100 of the second embodiment.
Figure 10:
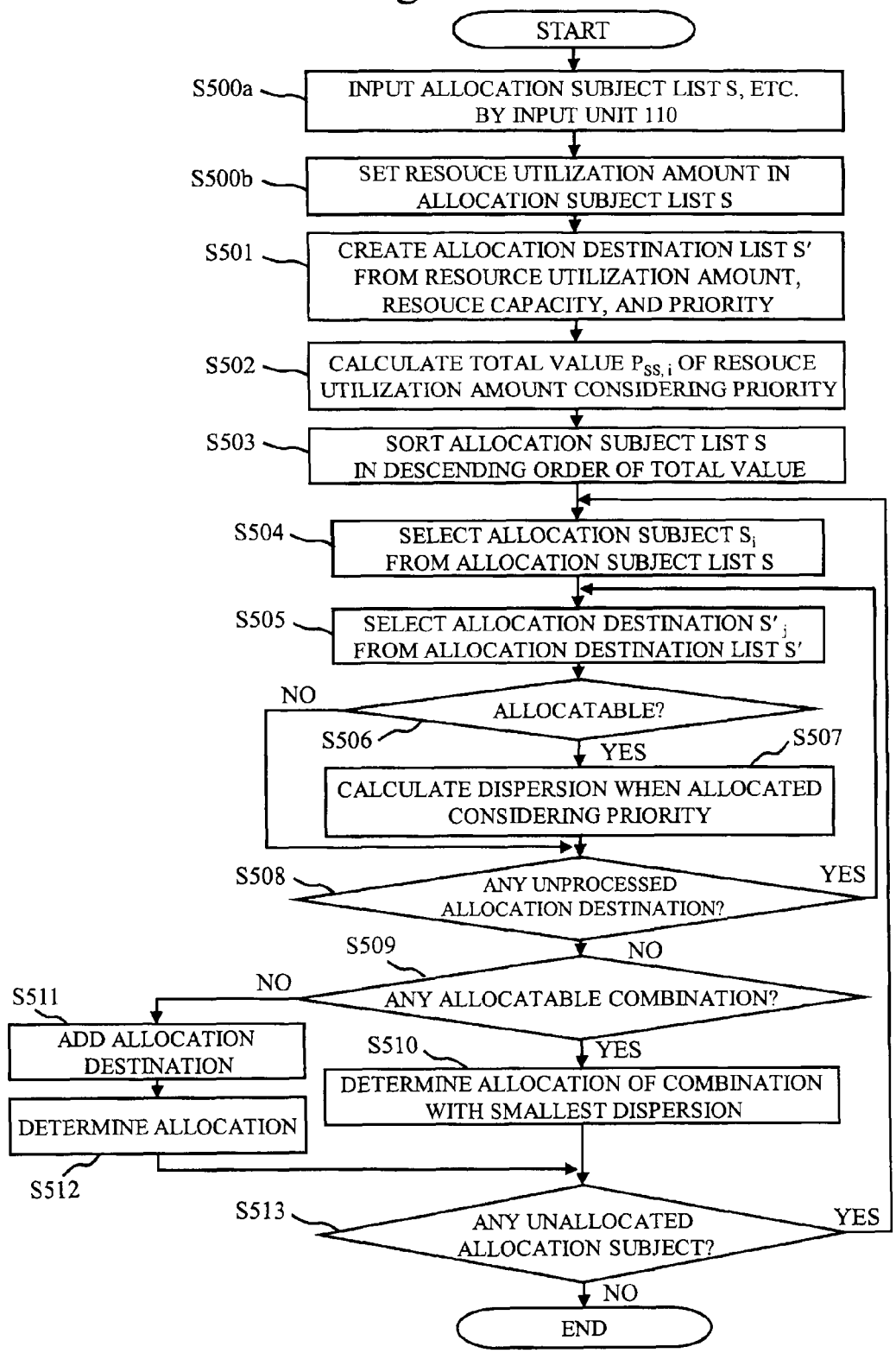
FIG. 10 is a flowchart showing operations of the resource allocation apparatus 100 of the first embodiment.
Figure 12:
FIG. 12 is an allocation destination resource capacity P' of the first embodiment.
Figure 22:
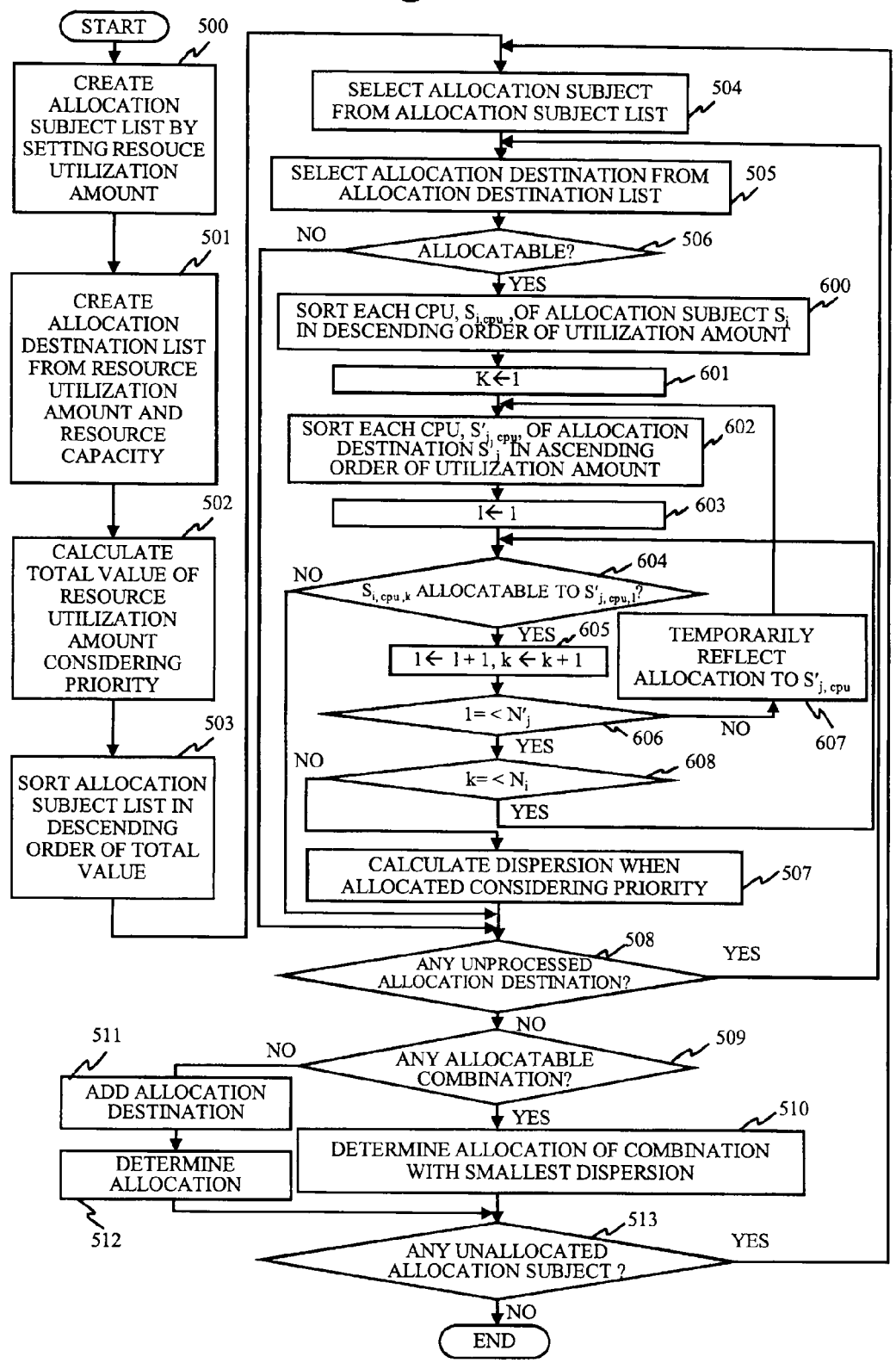
FIG. 22 is a flowchart showing operations of the second embodiment.
Figure 23:
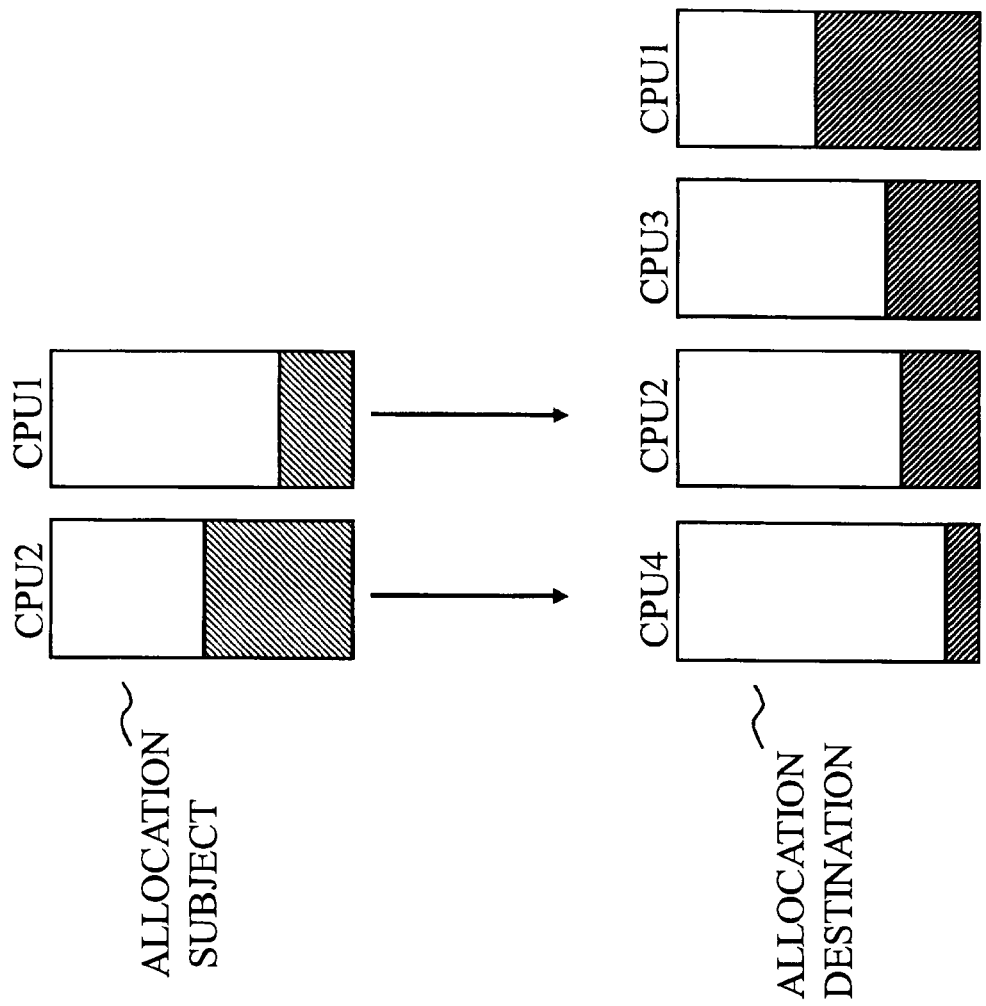
FIG. 23 is a diagram explaining an allocation method of CPU utilization amounts of the second embodiment.
Figure 24:
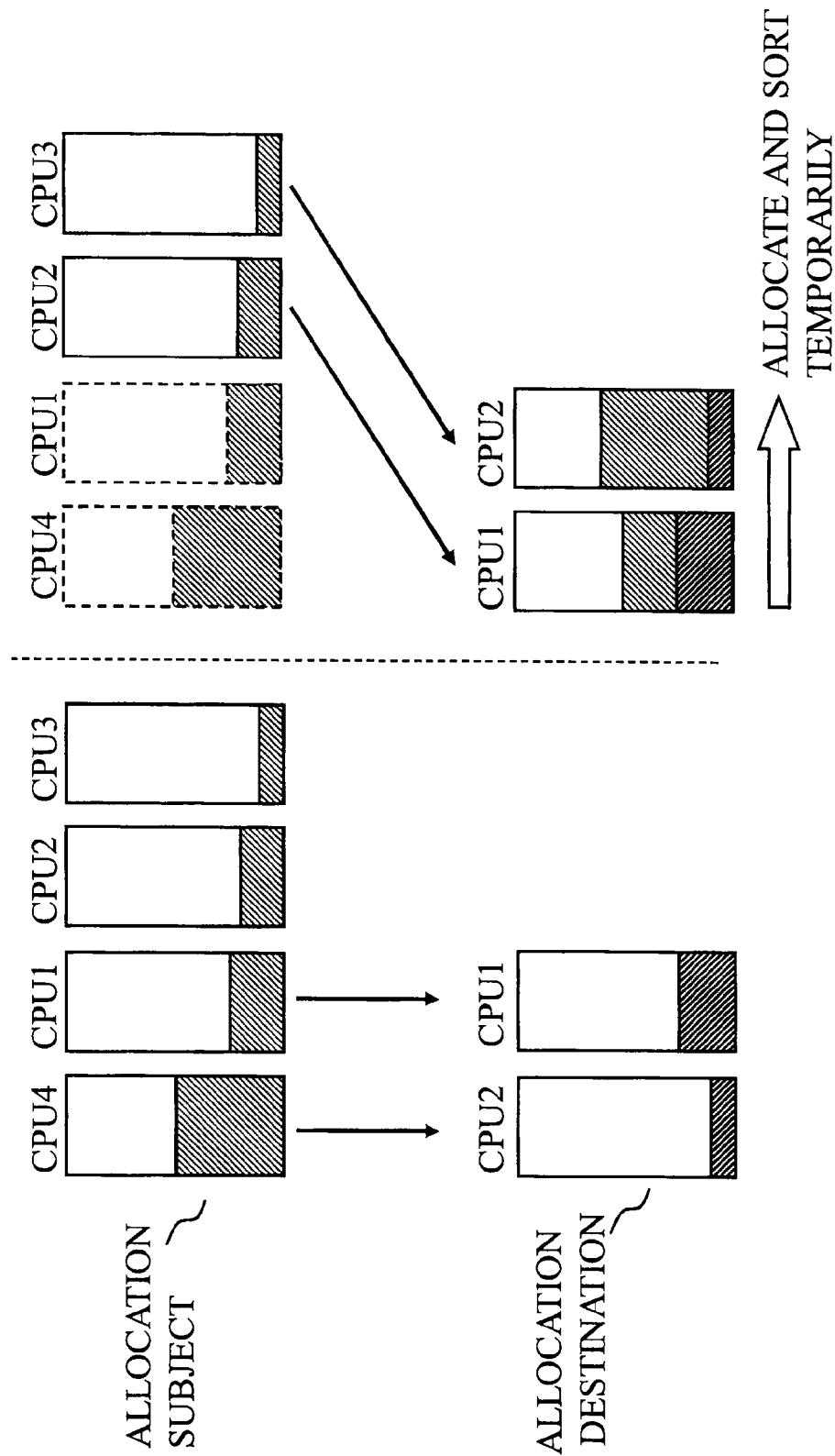
FIG. 24 is another diagram explaining the allocation method of CPU utilization amounts of the second embodiment.
Figure 25:
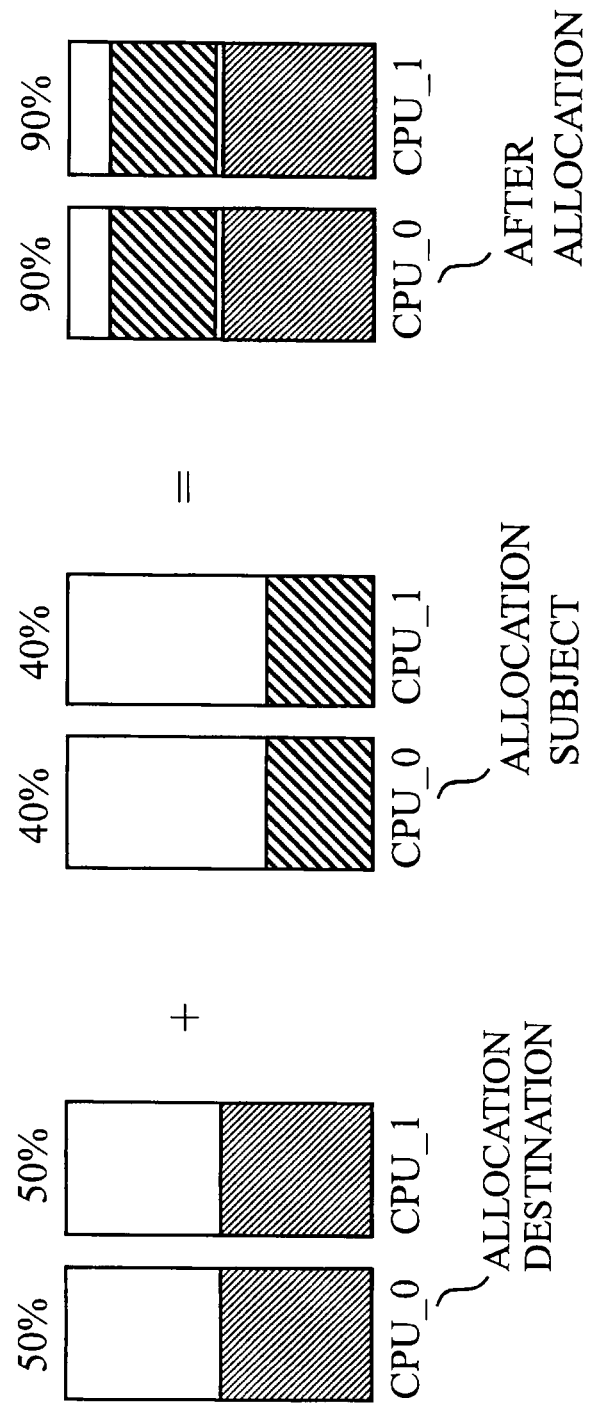
FIG. 25 is a diagram showing an addition method of the first embodiment in the second embodiment.
Figure 26:
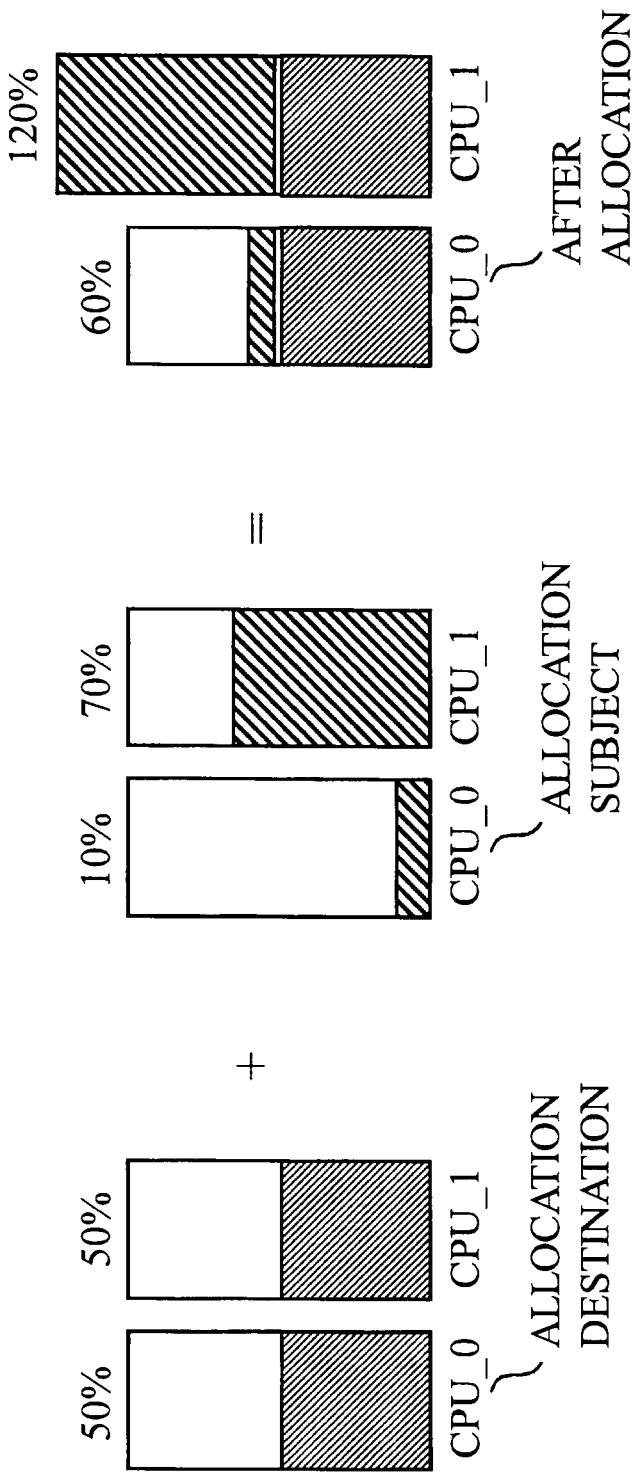
FIG. 26 is a diagram showing an addition method of the second embodiment.

S: allocation subject list, S': allocation destination list, A: allocatable list, α: priority, 100: resource allocation apparatus, 110: input unit, 120: allocation unit, 130: table storage unit, 121: configuration information table, 131: CPU load table, 132: memory utilization amount table, 133: disk utilization amount table, 134: disk access band table, 135: network load table, 140: list storage unit

The invention claimed is:

1. A resource allocation apparatus comprising:
a list storage unit configured to store a consolidation source list S containing a resource utilization amount of each resource type of each of an m number of consolidation source server apparatuses (m: an integer satisfying m≧3) to be consolidated and a consolidation destination list S' containing an n number of consolidation destination server apparatuses (n: an integer satisfying n<m and n≧2) to be used as consolidation destinations of the m number of consolidation source server apparatuses contained in the consolidation source list S;
a priority storage unit configured to store a priority specified for the each resource type; and
an allocation unit configured to select one of the consolidation source server apparatuses from the consolidation source list S and also select one of the consolidation destination server apparatuses from the consolidation destination list S', and, based on a current resource utilization amount of the selected one of the consolidation destination server apparatuses when the resource utilization amount of the selected one of the consolidation source server apparatuses is tentatively allocated to the selected one of the consolidation destination server apparatuses and each current resource utilization amount of all other of the consolidation destination server apparatuses contained in the consolidation destination list S', calculate a coefficient of variation defined as a ratio of an average to a standard deviation for the each resource type, multiply each of the coefficient of variation calculated for the each resource type by the priority specified for a same resource type as the each resource type corresponding to the each of the coefficient of variation so as to calculate a sum of respective multiplied results as a dispersion value,
by selecting another one of the consolidation destination server apparatuses from the consolidation destination list S' so as to select the consolidation destination server apparatuses one after another, calculate the dispersion value when the resource utilization amount of the selected one of the consolidation source server apparatuses is tentatively allocated to the selected another one of the consolidation destination server apparatuses, as described above, identify one of the consolidation destination server apparatuses corresponding to a minimum of the dispersion value among each of the dispersion value calculated for when the resource utilization amount of the selected one of the consolidation source server apparatuses is tentatively allocated to each of the n number of consolidation destination server apparatuses, determine that the resource utilization amount of the selected one of the consolidation source server apparatuses is allocated to the identified one of the consolidation destination server apparatuses, by selecting another one of the consolidation source server apparatuses from the consolidation source list S so as to select the consolidation source server apparatuses one after another, identify one of the consolidation destination server apparatuses corresponding to a minimum of the dispersion value among each of the dispersion value calculated for when the resource utilization amount of the selected another one of the consolidation source server apparatuses is allocated to each of the n number of consolidation destination server apparatuses, and determine that the resource utilization amount of the selected another one of the consolidation source server apparatuses is allocated to the identified one of the consolidation destination server apparatuses.

2. The resource allocation apparatus of claim 1, wherein the allocation unit is configured to calculate a deviation value of the resource utilization amount of each of the consolidation source server apparatuses for the each resource type contained in the consolidation source list S, multiply the deviation value calculated for the each resource type by the priority specified for a same resource type as the each resource type of the deviation value to calculate a sum of respective multiplied results as a total value, and when selecting one of the consolidation source server apparatuses from the consolidation source list S, select one of the consolidation source server apparatuses from the consolidation source list S according to the calculated total value.

3. The resource allocation apparatus of claim 1, further comprising:
a resource capacity storage unit configured to store a resource capacity of the each resource type of the consolidation destination server apparatuses,
wherein the allocation unit is configured to calculate a tentative number of the consolidation destination server apparatuses for the each resource type based on the resource capacity stored in the resource capacity storage unit and the resource utilization amount contained in the consolidation source list S, and, from each of the calculated tentative number, determine a number calculated for a same resource type as a resource type for which a maximum of the priority is specified, as a number n of the consolidation destination server apparatuses.

4. The resource allocation apparatus of claim 1, wherein the consolidation source server apparatuses and the consolidation destination server apparatuses mutually have a plurality of devices of at least one same resource type of mutually shared same resource types, and
when the allocation unit tentatively allocates the resource utilization amount of the same resource type of the selected one of the consolidation source server apparatuses to the selected one of the consolidation destination server apparatuses, each time the allocation unit sequentially allocates each resource utilization amount of the plurality of devices of the selected one of the consolidation source server apparatuses to any device of the plurality of devices of the selected one of the consolidation destination server apparatuses, the allocation unit is configured to evaluate whether a post-allocation resource utilization amount of the any device to which the resource utilization amount is allocated is within an allowable amount.

5. A non-transitory computer readable medium storing a resource allocation program that causes a computer to configure
a list storage unit to store a consolidation source list S containing a resource utilization amount of each resource type of each of an m number of consolidation source server apparatuses (m: an integer satisfying $m \geq 3$) to be consolidated and a consolidation destination list S' containing an n number of consolidation destination server apparatuses (n: an integer satisfying $n < m$ and $n \geq 2$) to be used as consolidation destinations of the m number of consolidation source server apparatuses contained in the consolidation source list S;
a priority storage unit to store a priority specified for the each resource type; and
an allocation unit to select one of the consolidation source server apparatuses from the consolidation source list S and also select one of the consolidation destination server apparatuses from the consolidation destination list S', and, based on a current resource utilization amount of the selected one of the consolidation destination server apparatuses when the resource utilization amount of the selected one of the consolidation source server apparatuses is tentatively allocated to the selected one of the consolidation destination server apparatuses and each current resource utilization amount of all other of the consolidation destination server apparatuses contained in the consolidation destination list S', calculate a coefficient of variation defined as a ratio of an average to a standard deviation for the each resource type, multiply each of the coefficient of variation calculated for the each resource type by the priority specified for a same resource type as the each resource type corresponding to the each of the coefficient of variation so as to calculate a sum of respective multiplied results as a dispersion value, by selecting another one of the consolidation destination server apparatuses from the consolidation destination list S' so as to select the consolidation destination server apparatuses one after another, calculate the dispersion value when the resource utilization amount of the selected one of the consolidation source server apparatuses is tentatively allocated to the selected another one of the consolidation destination server apparatuses, as described above, identify one of the consolidation destination server apparatuses corresponding to a minimum of the dispersion value among each of the dispersion value calculated for when the resource utilization amount of the selected one of the consolidation source server apparatuses is tentatively allocated to each of the n number of consolidation destination server apparatuses, determine that the resource utilization amount of the selected one of the consolidation source server apparatuses should be allocated to the identified one of the consolidation destination server apparatuses, by selecting another one of the consolidation source server apparatuses from the consolidation source list S so as to select the consolidation source server apparatuses one after another, identify one of the consolidation destination server apparatuses corresponding to a minimum of the dispersion value among each of the dispersion value calculated for when the resource utilization amount of the selected another one of the consolidation source server apparatuses is allocated to each of the n number of consolidation destination server apparatuses, and determine that the resource utilization amount of the selected another one of the consolidation source server apparatuses should be allocated to the identified one of the consolidation destination server apparatuses, as described above.

6. A resource allocation method performed by a computer including a list storage unit, a priority storage unit, and an allocation unit, the resource allocation method comprising:

(1) by the list storage unit, storing a consolidation source list S containing a resource utilization amount of each resource type of each of an m number of consolidation source server apparatuses (m: an integer satisfying m≧3) to be consolidated and a consolidation destination list S' containing an n number of consolidation destination server apparatuses (n: an integer satisfying n<m and n≧2) to be used as consolidation destinations of the m number of consolidation source server apparatuses contained in the consolidation source list S;

(2) by the priority storage unit, storing a priority specified for the each resource type; and (3) by the allocation unit, selecting one of the consolidation source server apparatuses from the consolidation source list S and also selecting one of the consolidation destination server apparatuses from the consolidation destination list S', and, based on a current resource utilization amount of the selected one of the consolidation destination server apparatuses when the resource utilization amount of the selected one of the consolidation source server apparatuses is tentatively allocated to the selected one of the consolidation destination server apparatuses and each current resource utilization amount of all other of the consolidation destination server apparatuses contained in the consolidation destination list S', calculating a coefficient of variation defined as a ratio of an average to a standard deviation for the each resource type, multiplying each of the coefficient of variation calculated for the each resource type by the priority specified for a same resource type as the each resource type corresponding to the each of the coefficient of variation so as to calculate a sum of respective multiplied results as a dispersion value, by selecting another one of the consolidation destination server apparatuses from the consolidation destination list S' so as to select the consolidation destination server apparatuses one after another, calculating the dispersion value when the resource utilization amount of the selected one of the consolidation source server apparatuses is tentatively allocated to the selected another one of the consolidation destination server apparatuses, as described above, identifying one of the consolidation destination server apparatuses corresponding to a minimum of the dispersion value among each of the dispersion value calculated for when the resource utilization amount of the selected one of the consolidation source server apparatuses is tentatively allocated to each of the n number of consolidation destination server apparatuses, determining that the resource utilization amount of the selected one of the consolidation source server apparatuses should be allocated to the identified one of the consolidation destination server apparatuses, by selecting another one of the consolidation source server apparatuses from the consolidation source list S so as to select the consolidation source server apparatuses one after another, identifying one of the consolidation destination server apparatuses corresponding to a minimum of the dispersion value among each of the dispersion value calculated for when the resource utilization amount of the selected another one of the consolidation source server apparatuses is allocated to each of the n number of consolidation destination server apparatuses, and determining that the resource utilization amount of the selected another one of the consolidation source server apparatuses should be allocated to the identified one of the consolidation destination server apparatuses, as described above.

* * * * *